(12) United States Patent  (10) Patent No.: US 8,276,152 B2
Sanghvi et al.  (45) Date of Patent: Sep. 25, 2012

(54) VALIDATION OF THE CHANGE ORDERS TO AN I T ENVIRONMENT

(75) Inventors: Ashvinkumar J. Sanghvi, Sammamish, WA (US); Kristoffer S. Schultz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1299 days.

(21) Appl. No.: 11/950,973

(22) Filed: Dec. 5, 2007

(65) Prior Publication Data

US 2009/0150887 A1  Jun. 11, 2009

(51) Int. Cl.
*G06F 9/44* (2006.01)
*G06F 3/048* (2006.01)
(52) U.S. Cl. .................. 718/106; 718/102; 715/771
(58) Field of Classification Search .................. 718/102, 718/106
See application file for complete search history.

(56) References Cited

U.S. PATENT DOCUMENTS

| | | | |
|---|---|---|---|
| 5,860,007 A | 1/1999 | Soni et al. | |
| 6,591,259 B1 | 7/2003 | Sholars | |
| 6,684,192 B2 * | 1/2004 | Honarvar et al. | 705/7.31 |
| 6,725,454 B1 | 4/2004 | Nagel et al. | |
| 6,938,081 B1 * | 8/2005 | Mir | 709/223 |
| 6,970,813 B1 * | 11/2005 | Houlding et al. | 703/13 |
| 6,996,601 B1 | 2/2006 | Smith | |
| 7,089,530 B1 * | 8/2006 | Dardinski et al. | 717/105 |
| 7,213,037 B2 | 5/2007 | Rangadass | |
| 7,272,815 B1 * | 9/2007 | Eldridge et al. | 717/101 |
| 7,710,418 B2 * | 5/2010 | Fairclough | 345/426 |
| 7,925,491 B2 * | 4/2011 | Sasatani et al. | 703/22 |
| 2004/0002880 A1 * | 1/2004 | Jones | 705/7 |
| 2004/0078105 A1 * | 4/2004 | Moon et al. | 700/100 |
| 2005/0049882 A1 | 3/2005 | Sawka | |
| 2005/0165919 A1 * | 7/2005 | Qian et al. | 709/223 |
| 2005/0256961 A1 * | 11/2005 | Alon et al. | 709/229 |
| 2006/0075387 A1 | 4/2006 | Martin et al. | |
| 2006/0129843 A1 | 6/2006 | Srinivasa et al. | |
| 2006/0161879 A1 | 7/2006 | Lubrecht et al. | |
| 2006/0195494 A1 | 8/2006 | Dietrich | |
| 2006/0235962 A1 * | 10/2006 | Vinberg et al. | 709/224 |
| 2006/0282302 A1 | 12/2006 | Hussain | |
| 2008/0091504 A1 * | 4/2008 | Lyle et al. | 705/9 |
| 2008/0120617 A1 * | 5/2008 | Keller et al. | 718/101 |

OTHER PUBLICATIONS

Kramer et al., "The Evolving Philosophers Problem: Dynamic Change Management", London, Aug. 19, 1991, pp. 1-33.
Ren et al., "Chianti: A Tool for Change Impact Analysis of Java Programs" ACM Press, Canada, Oct. 24-28, 2004, pp. 432-448.
Law et al., "Whole Program Path-Based Dynamic Impact Analysis" pp. 1-11, IEEE, 2003.

* cited by examiner

*Primary Examiner* — Meng An
*Assistant Examiner* — Abu Z Ghaffari

(57) ABSTRACT

A change order to be executed at a scheduled time as part of a change plan is created, wherein the change order to define a change to an Information Technology (IT) environment. The change order is validated against validation rules to simulate execution of the change order at the scheduled time wherein other change orders scheduled to execute before the execution of the change order are included in the simulation. Breaks in change orders scheduled to execute after the change order are detected. Side effects caused by execution of the change order are determined. The results of validating the change order are output.

18 Claims, 28 Drawing Sheets

VALIDATION OF THE CHANGE ORDERS TO AN I T ENVIRONMENT

BACKGROUND

Whenever many people are focused on different aspects of an interconnected system, to maintain order, one needs processes and policies. In Information Technology (IT) management, an Information Technology Infrastructure Library (ITIL) is an accepted group of best practices for information services management. The IT Service management disciplines include Change management, Incident and Problem Management, and Asset Management.

Change Management is the discipline of introducing changes to an IT environment (e.g., an organization's enterprise) in a planned and controlled manner. This involves human workflows for initiating, reviewing, approving and authorizing the changes, scheduling them, notifying effected parties, enacting the changes and keeping record of the changes. It also involves periodically auditing the IT environment to make sure that the records indeed reflect reality.

Today, most automation to help and coordinate IT work in Change Management is around the workflows that deal with change orders in the text form that define changes. Humans manually perform activities associated with change orders such as analysis, design, planning, business decision making, scheduling and negotiation. Further, change orders are managed using different IT managements tools that refer to information about the IT environment which might not be up to date or even available.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention are directed to process aware change management. Changes to an IT environment may be created and scheduled. A sequence of one or more changes may be put together to form a change plan. The plan may be validated against IT rules and policies. Revisions to intermediate changes in the plan may cause re-validation of the plan to determine if the revision results in change breaks downstream of the revised change. Also, side effects of executing a change may be determined.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

Figure 1:
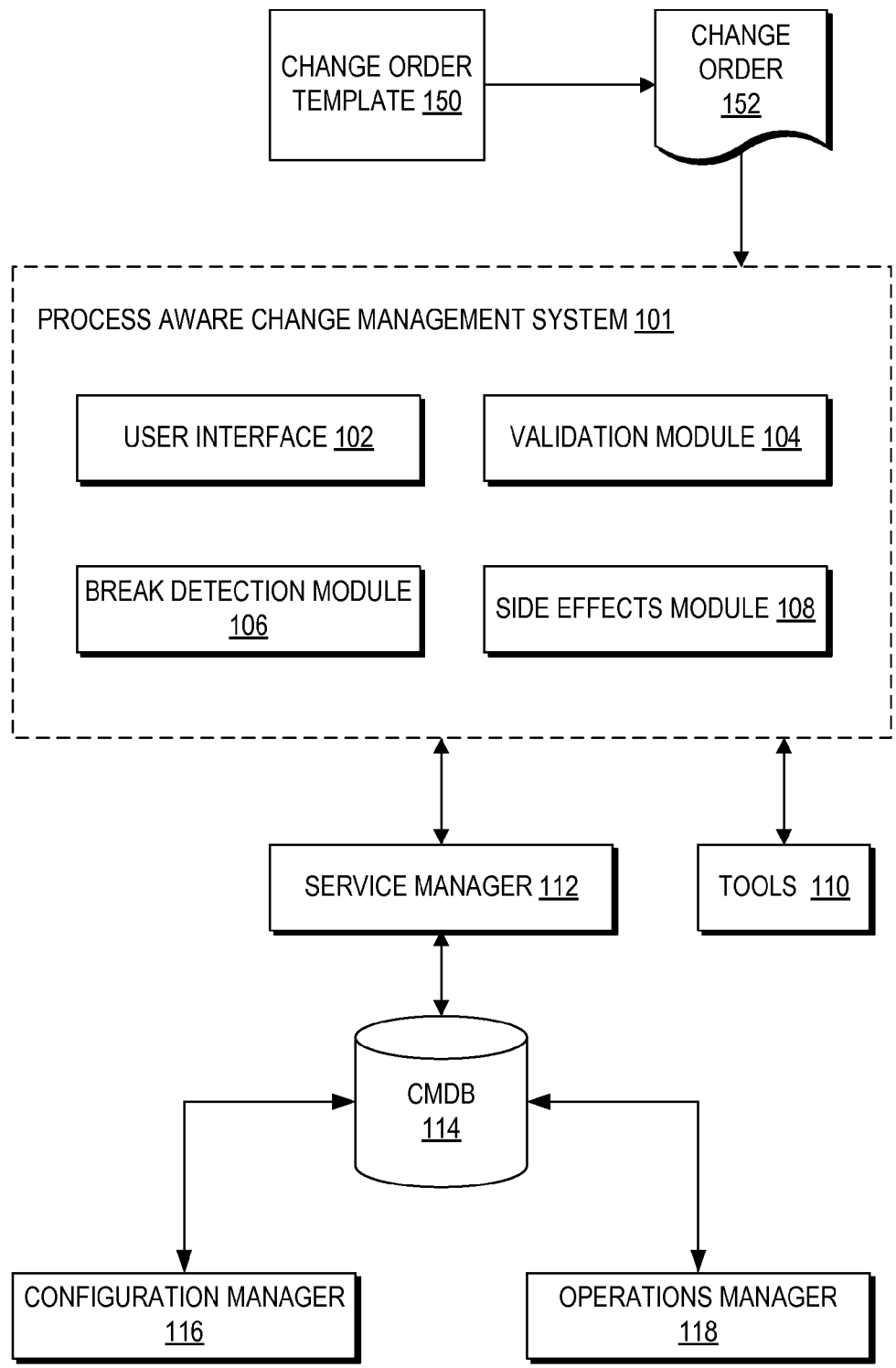
FIG. 1 is a block diagram of a process aware change management system in accordance with an embodiment of the invention.

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Embodiments of the invention are directed to process aware change management. Process aware change management provides users (e.g., system administrators), automated help, guidance and analysis to make the right planning decisions, while protecting them from making decisions that violate policies and procedures, or inadvertently affect another system adversely. Aspects of process aware change management include constructing a change plan, analyzing changes to the plan, and detecting side effects of executing the plan. Change management includes managing the life cycle of change orders from authoring to application to the Configuration Management Database (CMDB) when the corresponding configuration activity completes in the real world.

CONSTRUCTING A CHANGE PLAN: Individuals from business and IT can put together a change plan for modifying an IT environment (e.g., an enterprise). The execution of the plan involves one or more changes to the IT environment (e.g., deploy a new service, deploy new database, update software, change access control lists, etc.). Embodiments of process aware change management provide integrated change planning, simulations and validation.

As issues in the plans are detected, solutions are put forth by making adjustments in Service-Level Agreements (SLAs), costs, process or IT infrastructure. Sometimes multiple alternative change plans are considered. At the end of the process, a change plan may be scheduled that is mutually agreeable between service architecture, resources, policies, metrics, support processes and SLAs.

CHANGE OF PLANS: While a new change is being designed or pending deployment, the state of the IT environment may change. Ignoring those changes may result in failure during execution of the change (e.g., deployment of a new service). Process aware change management provides automation to constantly keep the state of the IT environment up to date and to constantly re-validate existing change plans.

Embodiments of the invention provide mechanisms to detect breakdowns of change plans and automation to correct for it and validate the correction. For example, in some cases, only certain sequences of changes are valid. Assume that a bunch of these valid branching sequences are in various stages of proposals, reviews and approvals, each leading to a different parallel universe. A new change could be appended to the end of a branch, and to pass validation, it might require versioning a change that executes before the new change. Or, a new change could be inserted in the middle of a branching sequence and then downstream changes need to be revalidated and versioned if necessary to remain valid.

DISCOVERY OF SIDE EFFECTS: When a change is enacted, it can impact many individuals, business processes and services because they share resources or processes. Process aware change management provides automation to schedule a change in such a way that the impact is minimized and the remaining impacted users notified, to make sure that there are no surprises.

Before approving a change, decision makers need to answer questions such as—Does the change require a reboot? Where? How long does it take? Does it require availability of an operator on site? Does it require any interaction with an end user? Does it temporarily violate any policies? Does it require a lot of network I/O? What monitoring alerts should be suppressed to eliminate noise? Embodiments of the invention provide ways to pre-compute this impact on the IT environment.

Embodiments of the invention may include analysis across multiple tools, simulated time travel, and change notification spam control.

ANALYSIS ACROSS MULTIPLE TOOLS: Embodiments of the invention provide a way to extract the change order information in a standardized document (e.g., an XML document) that can then be consumed by multiple tools and systems. When a certain change is contemplated, it can have an impact on many areas—business process, contracts, licensing, performance, SLAs, availability, power and cooling, project schedules, costs, policy compliance, development, etc. However, the deeper context, knowledge and expertise required to do each analysis resides with different people and tools. In fact, some tools might be third party. Embodiments herein allow different tools to subscribe to the process aware management system and provide validation of change orders.

TIME TRAVEL AND PARALLEL UNIVERSES: Embodiments of the invention provide a way to extract the change information from a specific point in time in the past, or future, assuming a certain set of changes are made. At any given time, multiple teams could be working on issues surrounding the same service. However, people working on a problem analysis might be looking at a historic point in time; people working on Plan A might be looking at a future point in time while other planners might be working on a Plan B which assumes another future; while a help desk operator might be looking at the current point in time. Embodiments of the invention provide a single place to coordinate the activity and proposed changes of multiple teams.

Also, a change manager might be working on a future change, based on how the system ought to be, at that time, while a configuration manager might be studying why the scanned snapshot of the real world is not as it ought to be today. Embodiments herein allow a user to view snapshots of the state of the IT environment based on simulation of scheduled change orders against a model of the IT environment. In one embodiment, the model includes a CMDB sandbox discussed below.

NOTIFICATION SPAM CONTROL: Embodiments of the invention identify the users impacted by a change and send only notifications to those people. Also, the notifications include information meaningful to a user (e.g., "Service A will be offline Saturday from 9-10 pm") instead of cryptic messages that fail to convey meaningful information (e.g., "Server A will be offline Saturday from 9-10 pm" when the user has no idea what services are hosted by Server A). Currently in IT, users are overwhelmed and desensitized by broadcast notifications.

FIG. 1 shows an operating environment 100 in accordance with an embodiment of the invention. In one embodiment, one or more components of operating environment 100 may be implemented by computer readable instructions executable by one or more computing devices. An example computing device is discussed below in conjunction with FIG. 28.

Environment 100 includes a process aware change management system 101. System 101 includes a user interface (UI) 102 to allow users to interact with system 101. System 101 also includes a validation module 104 for determining if a proposed change is valid, a break detection module 106 for determining if any downstream changes break (e.g., have errors) when a new change is added to a change plan or an existing change modified, and a side effects module 108 for determining any side effects that may occur when a change is executed. UI 102, and modules 104, 106, and 108 may be interconnected by interfaces (not shown).

Process aware change management system 101 is connected to service manager 112. Service manager 112 provides information about services in an organization's IT environment. Service manager 112 views the IT environment from a service point of view and not just the states of various machines (e.g., server A is down, server B is rebooting, etc). Service manager 112 is connected to Configuration Management Database (CMDB) 114 which stores information (some in the form of objects) related to an organization's computing assets and the relationships between them. In one embodiment, service manager 112 includes a Microsoft® System Center Service Manager. Objects in CMDB 114 may represent machines, users, jobs, services, etc.

CMDB 114 is also connected to configuration manager 116 and operations manager 118. Configuration manager 116 handles asset deployment (hardware and/or software) and updating. Configuration manager 116 may also provide configuration monitoring to ensure systems comply with desired configuration models and policies. Configuration manager 116 may also generate reports showing what operating systems, applications, and software updates are installed on an organization's machines. In one embodiment, configuration manager 116 includes a Microsoft® System Center Configuration Manager. Operations manager 118 provides monitoring and management of an organization's IT environment, such as error handling and reporting services. In one embodiment, operations manager 118 includes a Microsoft® System Center Operations Manager.

Process aware change management system 101 works with CMDB 114. Process aware change management system 101 adds to the models in the CMDB (brought in by service management 112) by bringing in other process/business relevant objects (e.g., business processes, services, people, locations, organizations, policies, licenses, contracts, projects, schedules, SLAs, etc.) System 101 may also add new types of relationships between these objects like zone (e.g., member, ownership), governs (e.g., governed by, peers), uses (e.g., used by), layering (e.g., layered over, layered under), etc.

Process aware change management system 101 also brings in a different category of objects like Work Items (WIs), Workflows and Activities. Work items are objects like calls, incidents, problems, service or change requests that need to be assigned to people and tracked. They change state under specific life cycle constraints. The constraints are work item type specific and control allowed transitions and state change constraints and privileges. A work item declares its context by referring to configuration items in CMDB 114. For instance, an incident WI can express that user A is complaining that SLA B is being violated on Service C.

The data access layer to the CMDB provides object-relational methods for querying or navigating relationships. All access is controlled via a scope and role based security. In one embodiment, CMDB 114 is based on the Service Modeling Language (SML) repository and uses the Common Model Library (CML).

In one embodiment, CMDB 114 has information divided into two main categories—isness (e.g., actual state today) and oughtness (e.g., possible future state(s)). Isness is maintained by the scanning actions of operations manager 118 and configuration manager 116. Oughtness (including proposals, approved pending changes, etc.) is maintained by the process aware management system 101 by applying change orders to models of the CMDB data (referred to as "CMDB sandboxes"). Thus, process aware management system 101 is both a consumer and maintainer of CMDB information.

Process aware change management system 101 may also connect to tools 110. Tools 110 include multi vendor design, analysis and validation tools. Context extracted from the CMDB will be provided as standard SML documents. It will be up to the tool vendor (or integrator) to consume those documents. For example, the validation of a new change could include a spreadsheet calculation for power budget, a Microsoft® System Center Capacity Planner (SCCP) performance and scale check, a Microsoft® Office Project Server portfolio decision and a configuration manager 116 policy check.

In one embodiment, tools 110 have an API to be able to execute some of the simpler analysis programmatically; this will allow substitution of manual steps in the work flow with automation. Since the underlying tool is identical, the results will be consistent.

CMDB SANDBOXES: CMDB 114 is a vast interconnected object store. For most change plans, one only needs to look at a certain aspects of the model. Process aware change management system 101 includes built-in functions to navigate a directed graph of objects in the CMDB, both technical and business/process objects, and select the subset of the graph that is relevant to a particular workflow (i.e., plan) and extract that.

A standard workflow activity will enable the workflow to take a snapshot view of a certain part of the CMDB at a certain point in time in the past or the future and export it into an SML document which can be used by tools of any type. It can select objects and relationships only of certain types and scope, eliminating clutter.

Figure 2:
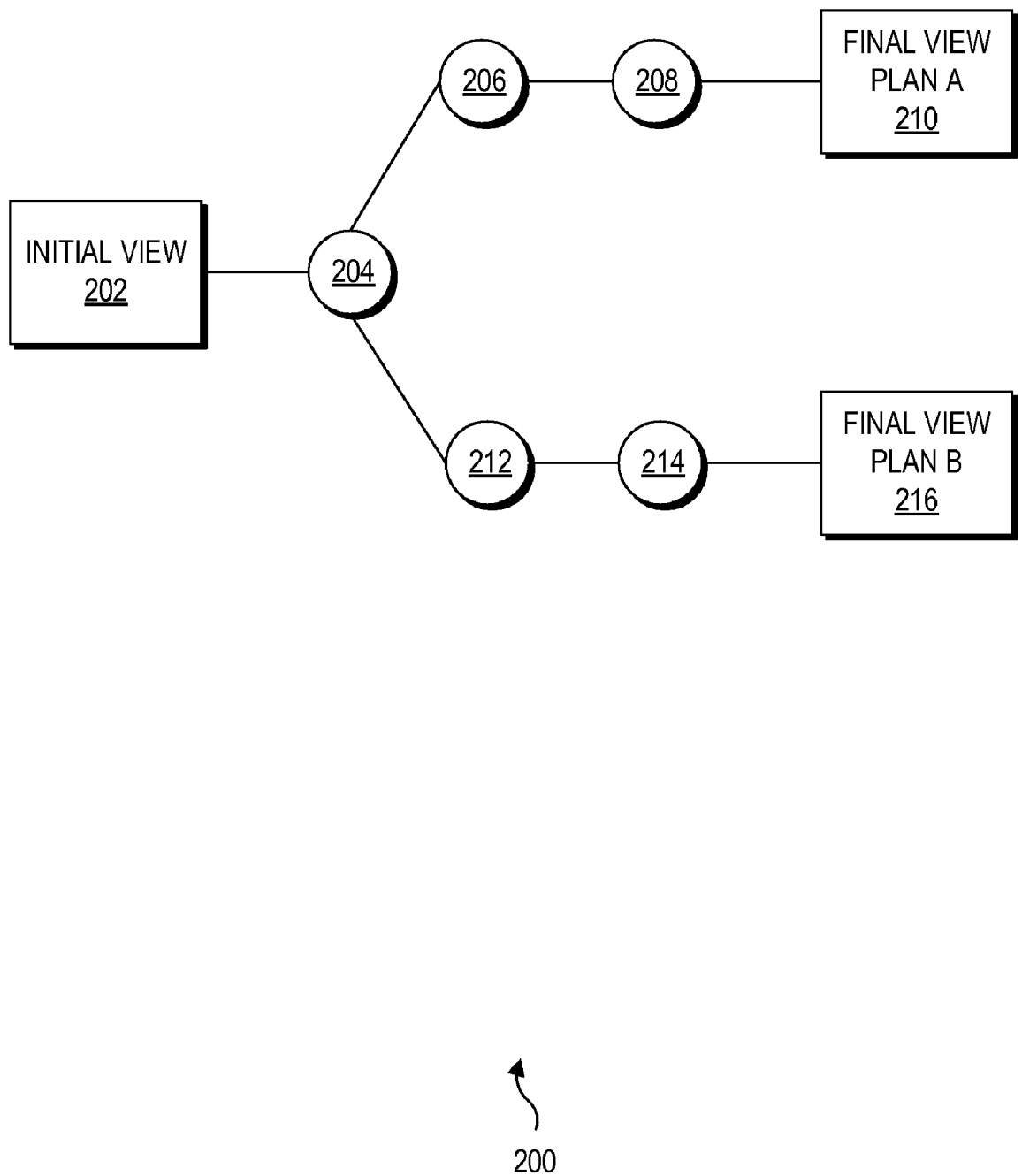
FIG. 2 is a block diagram of multiple plan views in accordance with an embodiment of the invention.

Referring to FIG. 2, alternate change plans (Plan A and Plan B) can be applied to an initial view 202. Initial view 202 may be the current "oughtness" view (i.e., state) of the IT environment or may be a view of the IT environment in the future. Plan A applies a sequence of changes 204, 206, and 208 in that order to initial view 202 to arrive at Final view Plan A 210. Plan B applies a sequence of changes 204, 212, and 214 in that order to initial view 202 to arrive at Final view Plan B 216. Thus, alternate universes in the future can be maintained by system 101. To maintain alternative plans, a temporary CMDB sandbox is established for each plan. In one embodiment, CMDB sandboxes may extract and manipulate data from CMDB 114 and may be stored memory. In some cases, a series of simulations may be executed on the sandbox CMDBs. Example simulations include change break detection and side effect detection (both discussed below).

CHANGE ORDERS: Change orders are used for managing and bookkeeping changes. Typically, a single change order is associated with each change. As shown in FIG. 1, change management system 101 receives a change order 152. A change order may include three parts: a change workflow, a change update query, and a change process temporary impact query.

In one embodiment, a change workflow includes machine readable instructions to enact the change. It will typically be a structured workflow including manual (e.g., human puts new server in cabinet) and/or automated activities (e.g., install software on new server) that when completed will accomplish the change in the real world.

In one embodiment, a change update query includes a query (or a set of queries) that when applied to a model (e.g., CMDB sandbox) of the IT environment will update all objects and relationships to a state as you would find them after successfully applying the change in the real world. For example, in FIG. 2, Final view Plan A 210 was created by applying the change update queries associated with changes 204, 206, and 208 in that sequence to initial view 202.

In one embodiment, a change process temporary impact query includes a query that will result in all "causes" that will temporarily become true while enacting the change. This information is used to determine side effects created when the change is executed using causality rules.

CHANGE ORDER TEMPLATES: Change orders are complex objects that need authoring. A change order template 150 may be filled-in to generate change order 152. Templates are pre-authored, so users only need to provide parameters by filling out a form to create a new change order. For example, a template may be defined to create a change order to apply a software patch to all machines in a group. The parameters to be supplied to the template include a patch number and a computer group name to create a change order. Thus, the user supplies the context to the change order template to create a change order. In one embodiment, a user may use UI 102 to fill-in a template (e.g., fill-in a text form, drag/drop objects in a view of the IT environment, etc.)

Figure 3:
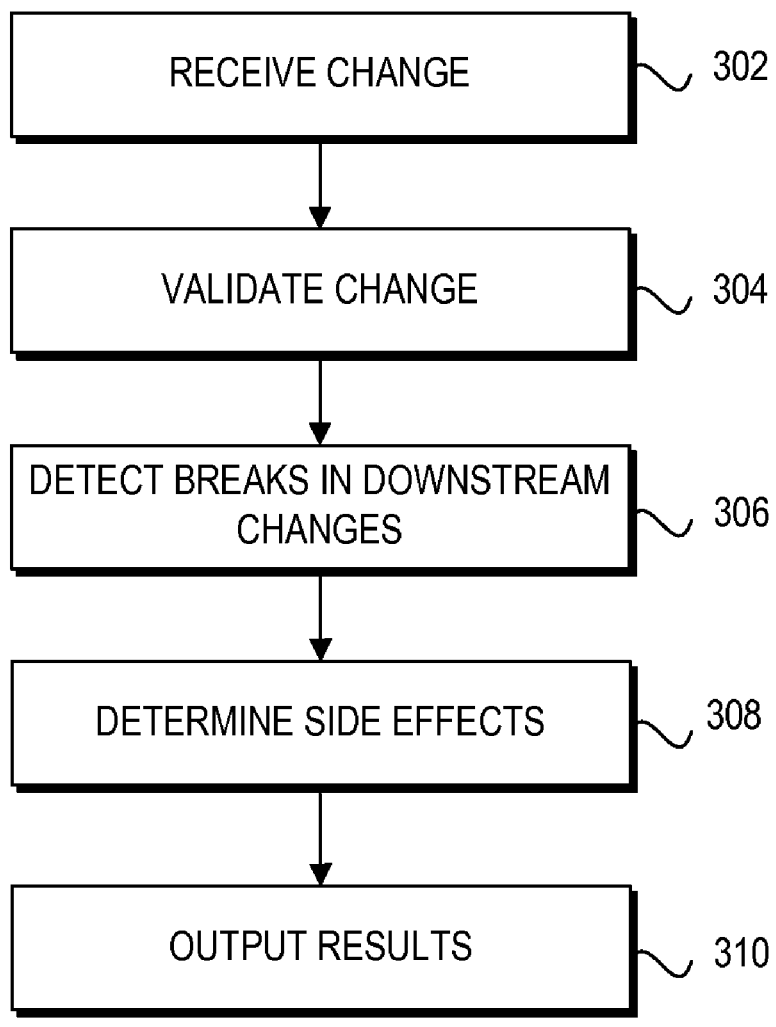
FIG. 3 is a flowchart showing operations of a process aware change management system in accordance with an embodiment of the invention.

Turning to FIG. 3, a flowchart 300 shows operations of a process aware change management system in accordance with an embodiment of the invention. In one embodiment, at least a portion of flowchart 300 may be implemented by computer readable instructions executable by one or more computing devices.

Starting with operation 302, a change order is received at the process aware change management system. In one embodiment, the change order is received from a user interacting with UI 102. In one embodiment, the change order includes an XML document that defines the change.

Next, in operation 304, the change order is validated against validation rules (such as in tools 110) to determine if the change order provides the desired changes. Simulated execution of the change order at the scheduled time is made. In one embodiment, the simulated execution of the change order is examined by various tools 110 available to change management system 101. In one embodiment, after validation, the user is shown errors in UI 102 associated with executing the proposed change at the scheduled time. The user may use this error information to modify the change and then re-validate the change.

Continuing, in operation 306, the logic detects breaks in already scheduled changes that depend on the new change (i.e., downstream changes). Next, in operation 308, the logic determines side effects of executing the proposed change at the proposed future time. In operation 310, results of the validation, change break detection, and/or side effects determination are output. The results may be displayed in UI 102, saved to a file, and the like.

Change Validation

Impact of a change plan is studied by many people in an organization using appropriate tools. Change orders that make up the plan are validated against various IT environment restraints. A tool specific to a discipline will use a CMDB model (typically created by applying a proposed change order to the model) and apply evaluation techniques to help analyze it.

Examples of analysis tools for evaluating the validity of a change include a power budget analysis tool, a performance check tool, a portfolio decision tool, a policy check tool, and a best practices analysis tool.

Racks have power and cooling budgets. To evaluate a change that reconfigures the make-up of installed computing devices (e.g., blades), a spreadsheet is automatically created from the CMDB view data and compared against a power budget. Power usage is picked up from information in the CMDB model for the machine.

Performance models may be applied to the configuration produced by the change order to evaluate resource utilization and response times as compared against SLA expectations.

In portfolio decision analysis, evaluations are made as to the business costs associated with implementing a change order (e.g., adding or removing a service). For example, a decision to bring payroll business processes into a company (as opposed to outsourcing) is generated by finding out all the systems and services supporting the payroll functions and determining licensing and support overhead costs.

Policy checking evaluates the change order against policies associated with objects involved in the change. For example, a tool compares objects in the resulting view from the change against policy objects to determine if any of the policies are violated. For example, a policy may require all Web services available to the public remain in a particular zone of the enterprise network. The best practices tool analysis tools validates a change against best practice rules, such as promulgated by ITIL.

Turning to FIGS. 4-11, an example of creating a change and validating the change using the process aware management system in accordance with embodiments of the invention are shown. In this example, a bank will be making changes to its current IT environment. FIGS. 4-11 show interactions with a user interface 400 for process aware change management system 101, however, embodiments of the invention are not limited to the user interface operations as described below.

Figure 4:
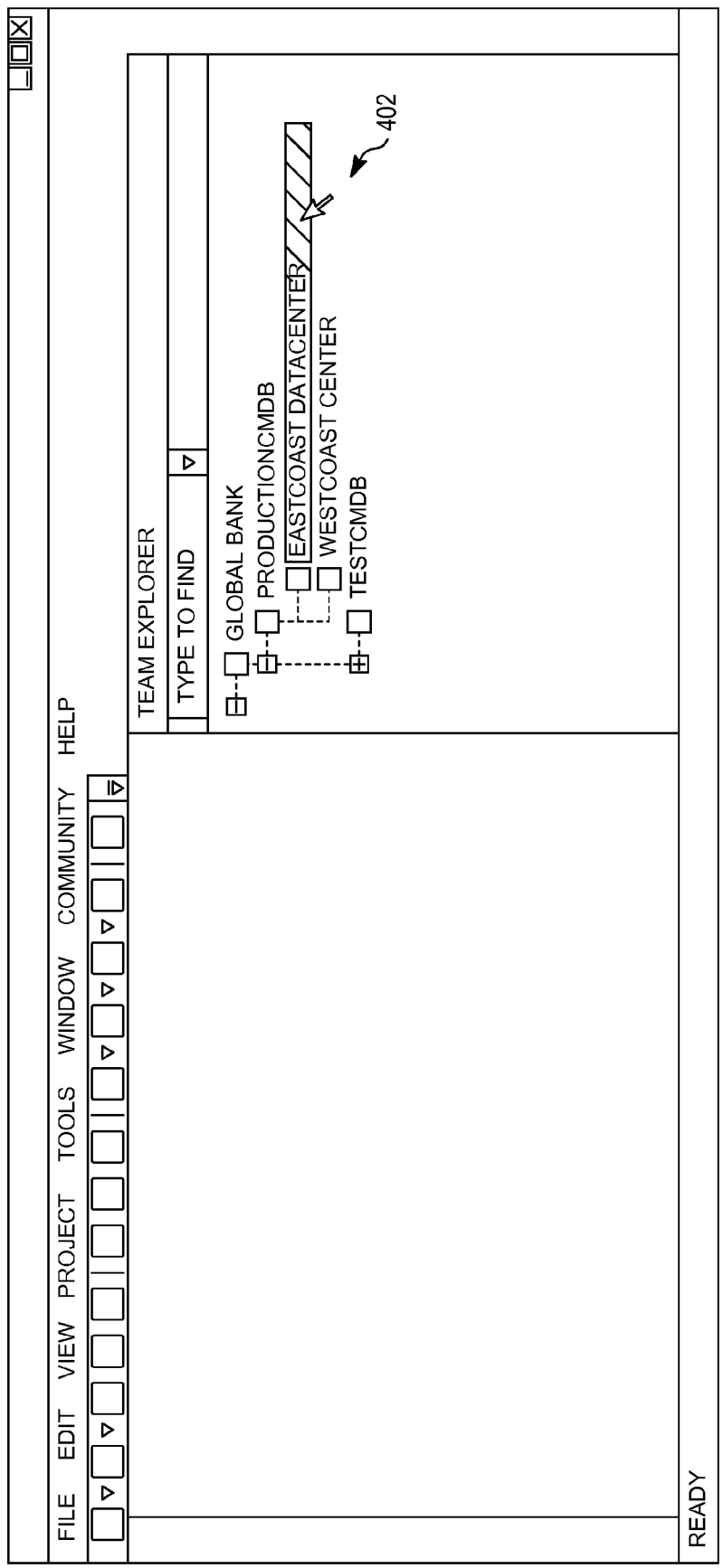
FIGS. 4-11 show operations of a process aware change management user interface in accordance with an embodiment of the invention.

In FIG. 4, a user (e.g., system administrator, enterprise architect, etc.) wishes to create a new service for the bank's network ("Globalbank"). At 402, the user selects a scope of view for the IT environment. For system management purposes, Globalbank is divided into ProductionCMDB and TestCMDB. ProductionCMDB is further divided into Eastcoast Datacenter and a Westcoast Datacenter. The user has selected the Eastcoast Datacenter as the view for creating the new service.

Figure 5:
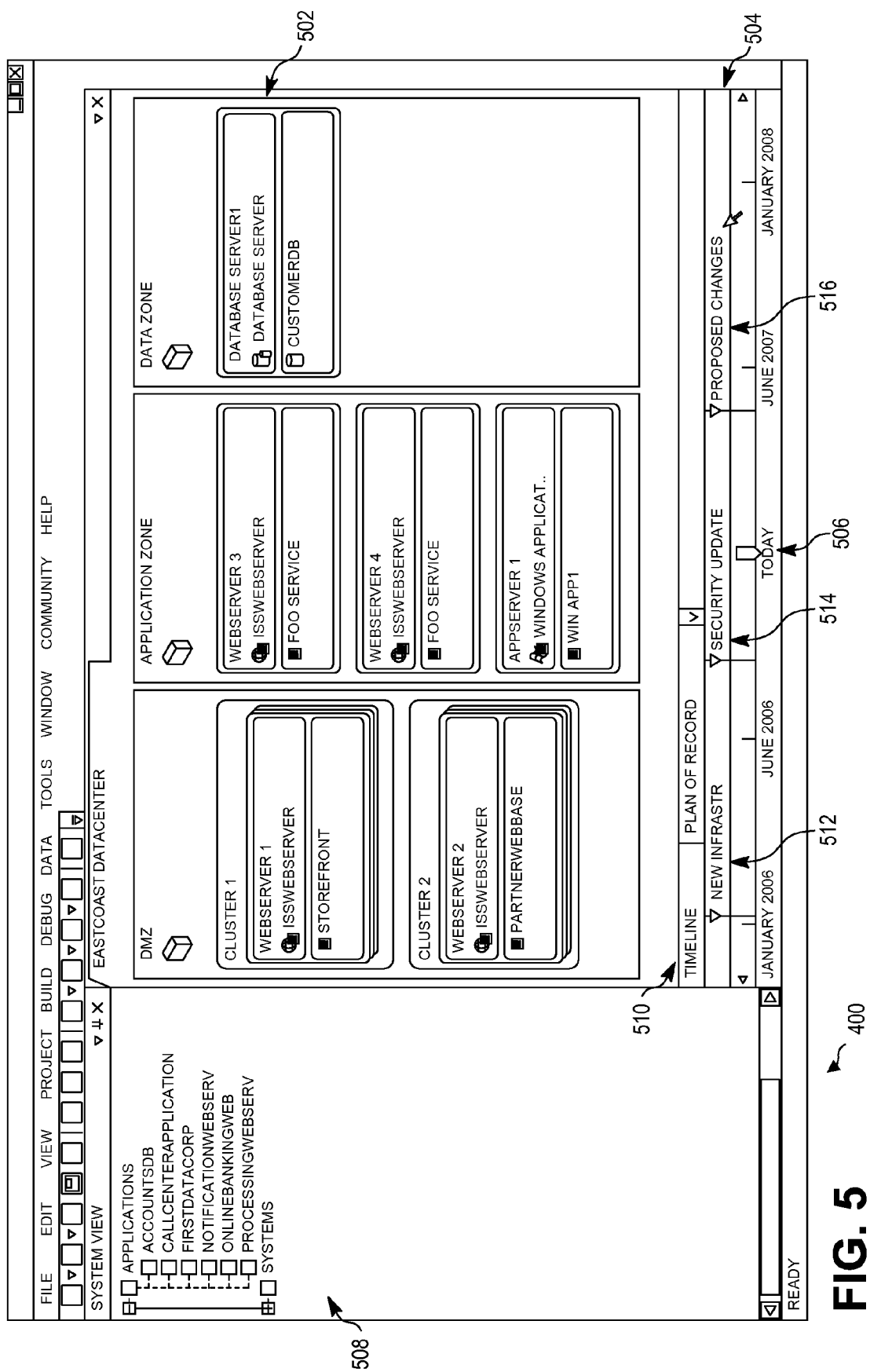

In one embodiment, the view is made from a system management point of view. In FIG. 5, the Eastcoast Datacenter is the chosen scope of view.

FIG. 5 shows the current view 502 of the Eastcoast Datacenter. The Eastcoast Datacenter is divided into a DMZ, an Application Zone, and a Data Zone. FIG. 5 also includes a timeline 504 that is used to show the state of the Eastcoast Datacenter at a particular point in time. A user may move slider 506 (currently set to Today) to see the state of the selected view in the past or in the future.

Timeline 504 also shows previously executed and scheduled change orders. For example, previously executed change orders 512 and 514 are shown on timeline 504; a change order 516 is scheduled for the future.

User interface 400 also allows the user to select from multiple timelines, as shown at 510. FIG. 5 shows the "Plan of Record" which is the change plan that will occur as scheduled. The user may also use a pull-down to select saved alternate plans ("Plan A", "Plan B", etc.). These alternate plans are associated with the CMDB sandboxes and allow a user to validate, modify/re-validate, and discover side effects of other change order plans in order to investigate alternative change order sequences. A user may use these alternative plans to test other change order plans (e.g., validation, detect change breaks, determine side effects) without disrupting the current Plan of Record.

Section 508 is used for creating new change orders. The user may drag and drop objects (e.g., machines, applications, etc.) into view 502 and assign the creation of the new objects to a change order. For example, at 508, the user may select an application (accounting, call center, etc.) or a machine (servers, clients, etc.) and place the object in the Eastcoast Datacenter view 502.

Figure 6:
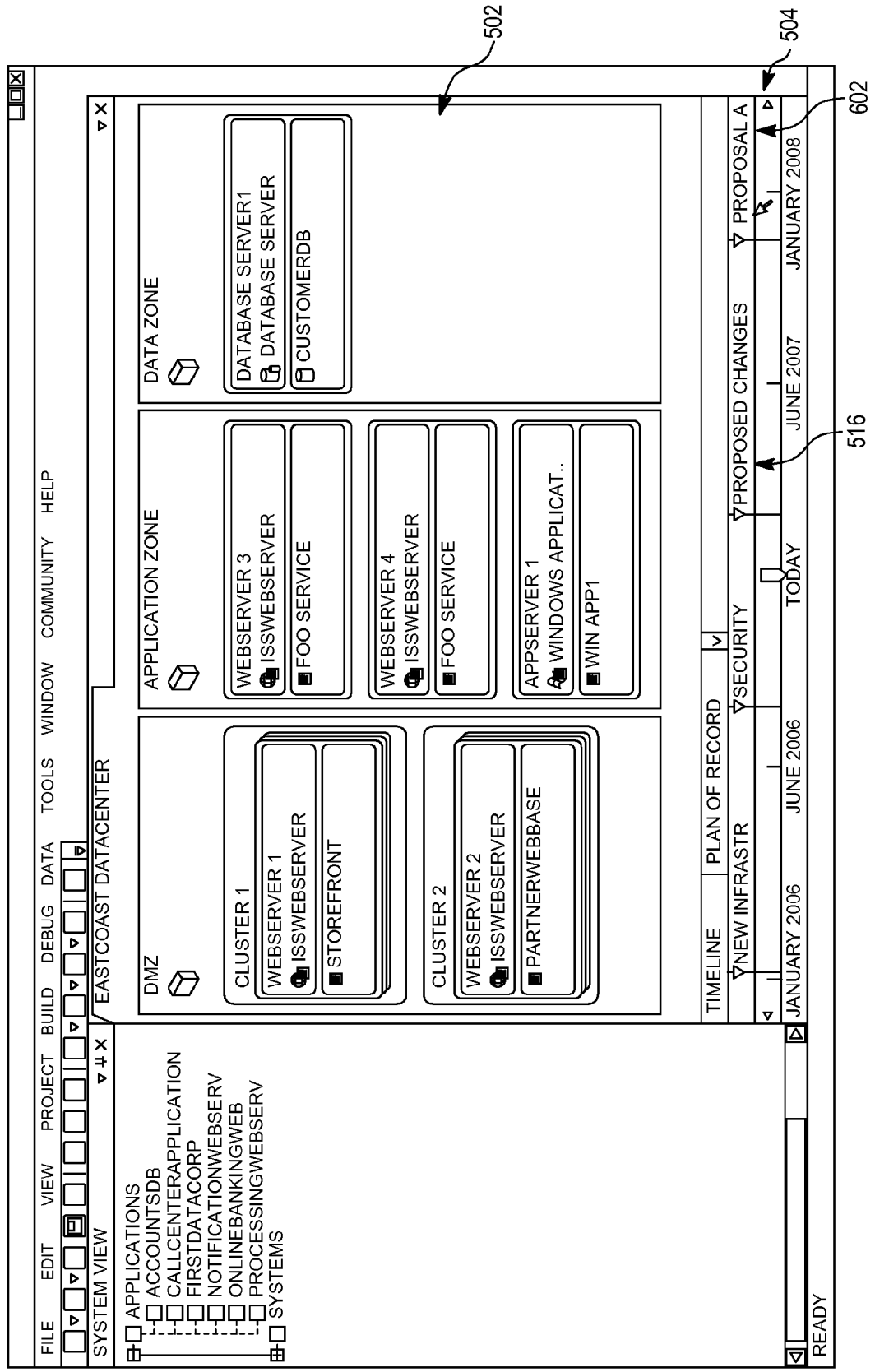

In FIG. 6, the user creates an empty changer order 602 in timeline 504. Change order 602 is empty until the user assigns various activities to change order 602. Change order 602 is to be executed at the point of time designated in timeline 504. As described below, empty change order 602 is filled using dragging/dropping of objects from section 508 but alternative techniques, such as filling in a form, may be used to fill change order 602.

Figure 7:
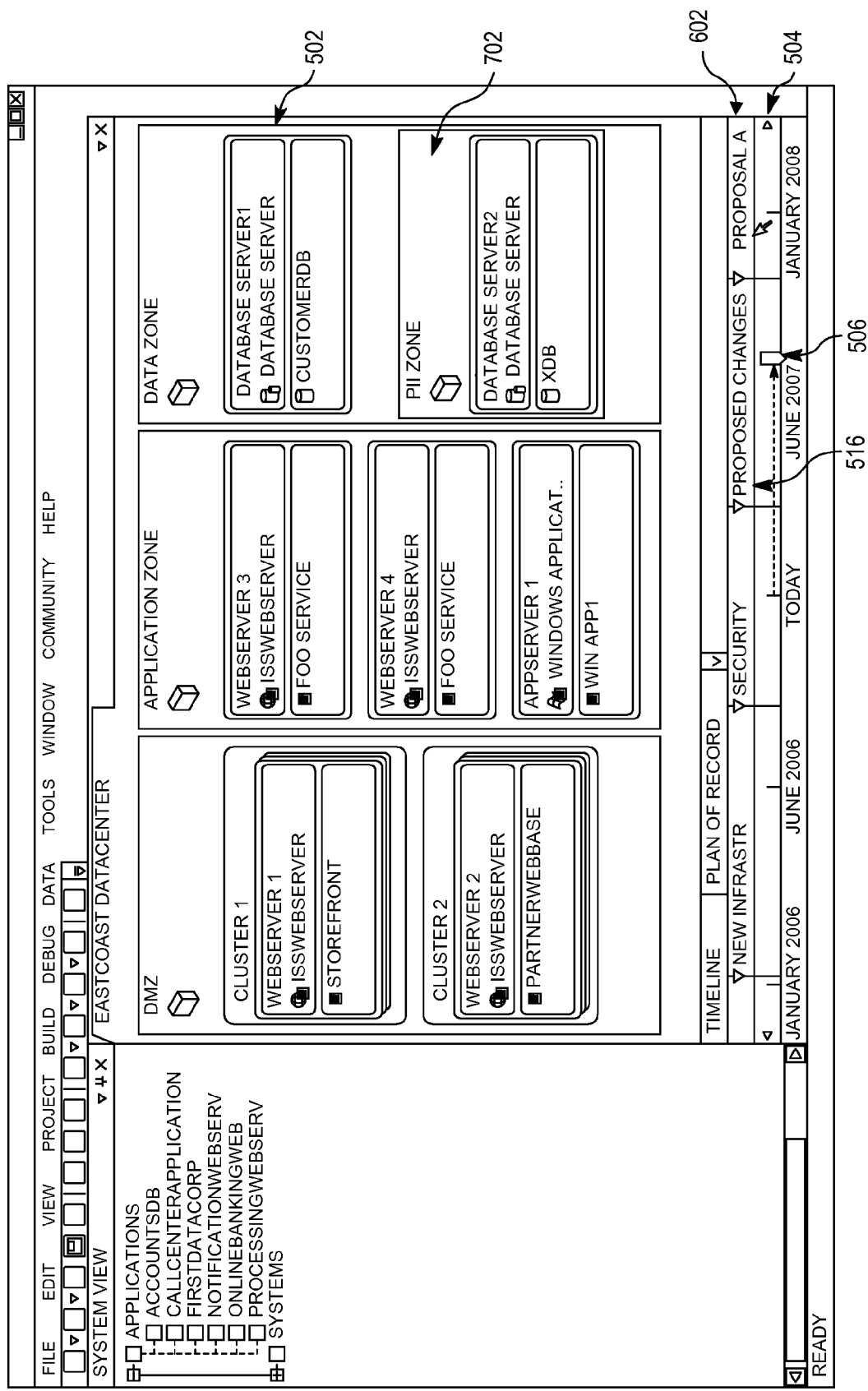

In FIG. 7, the user moves slider 506 to the point in time in the future of execution of change order 602. When moved forward in time, slider 506 passed change order 516, so change order 516 was "executed" in view 502 for purposes of the modeling in FIG. 7. To create the simulation of view 502 in the future, change order 516 was applied to a CMDB model of the IT environment.

Change order 516 created a PII Zone (shown at 702) in the DataZone. Datazone is a zone of SQL database servers. The SQL database servers are protected using backups, Access Control Lists (ACLs), physical building security, etc. PII Zone is a new zone to hold bank customer's personal information, such as name, address, account numbers, etc.

Figure 8:
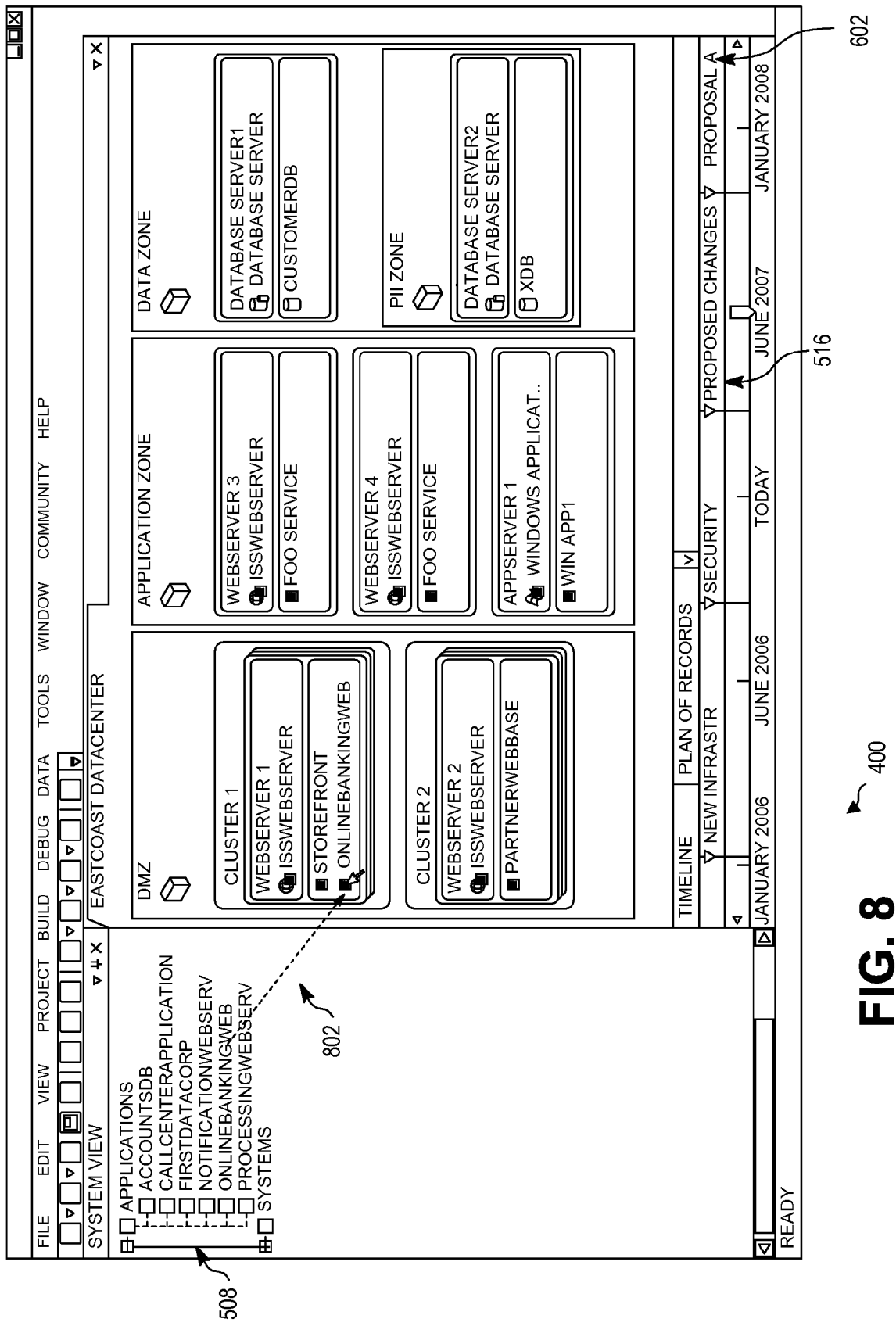
Figure 9:
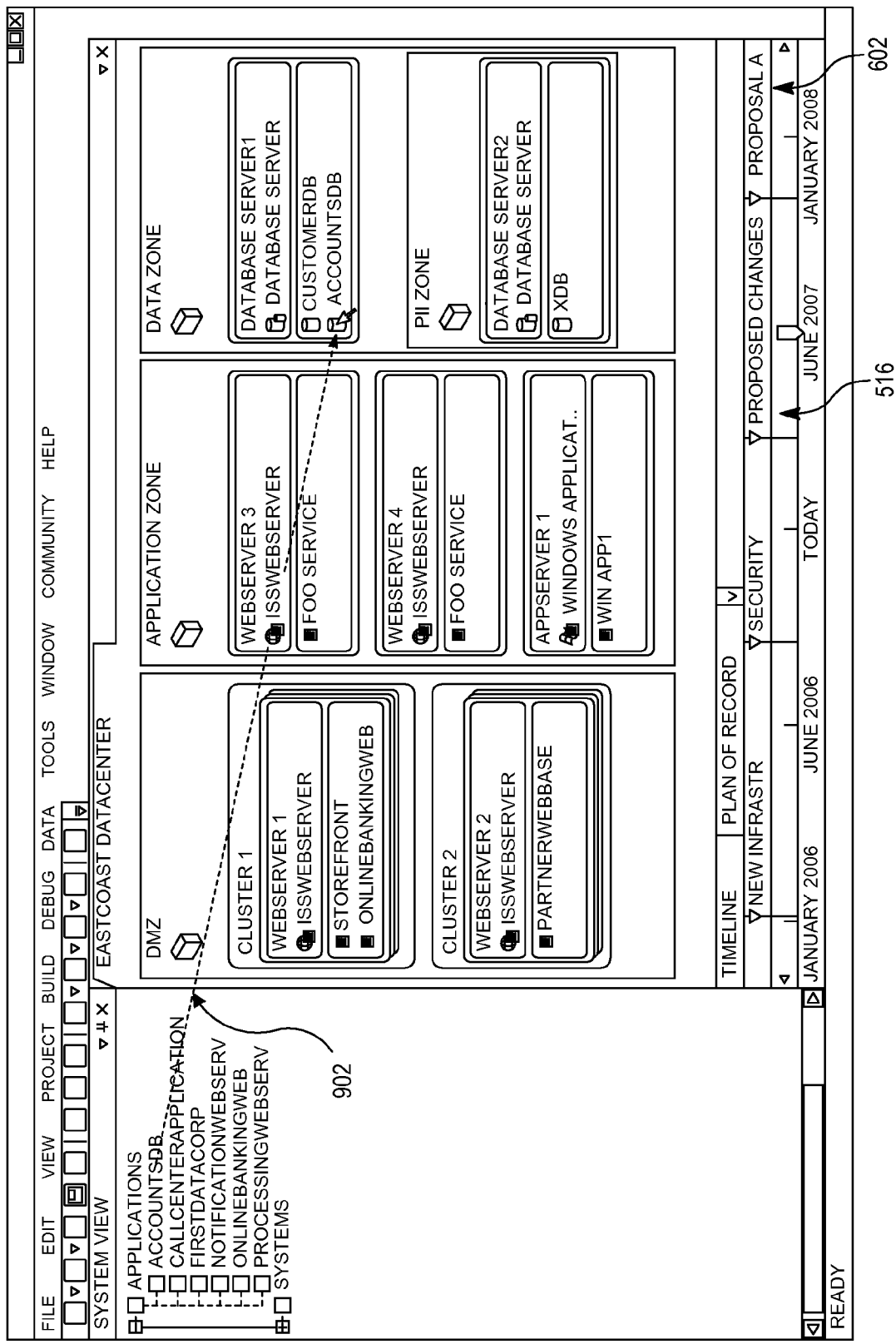

In FIGS. 8-9, the user is dragging/dropping objects from section 508 to fill the empty change request 602 with various activities. In FIG. 8, the user is adding an OnlineBankingWeb application to Cluster 1 of the DMZ, as shown at 802. In FIG. 9, the user is adding an AccountsDatabase to DatabaseServer1 in the Datazone, as shown at 902. It will be discovered during validation (discussed below) that placing an AccountsDatabase having customer personal data outside of the PII Zone is a violation of policy.

Figure 10:
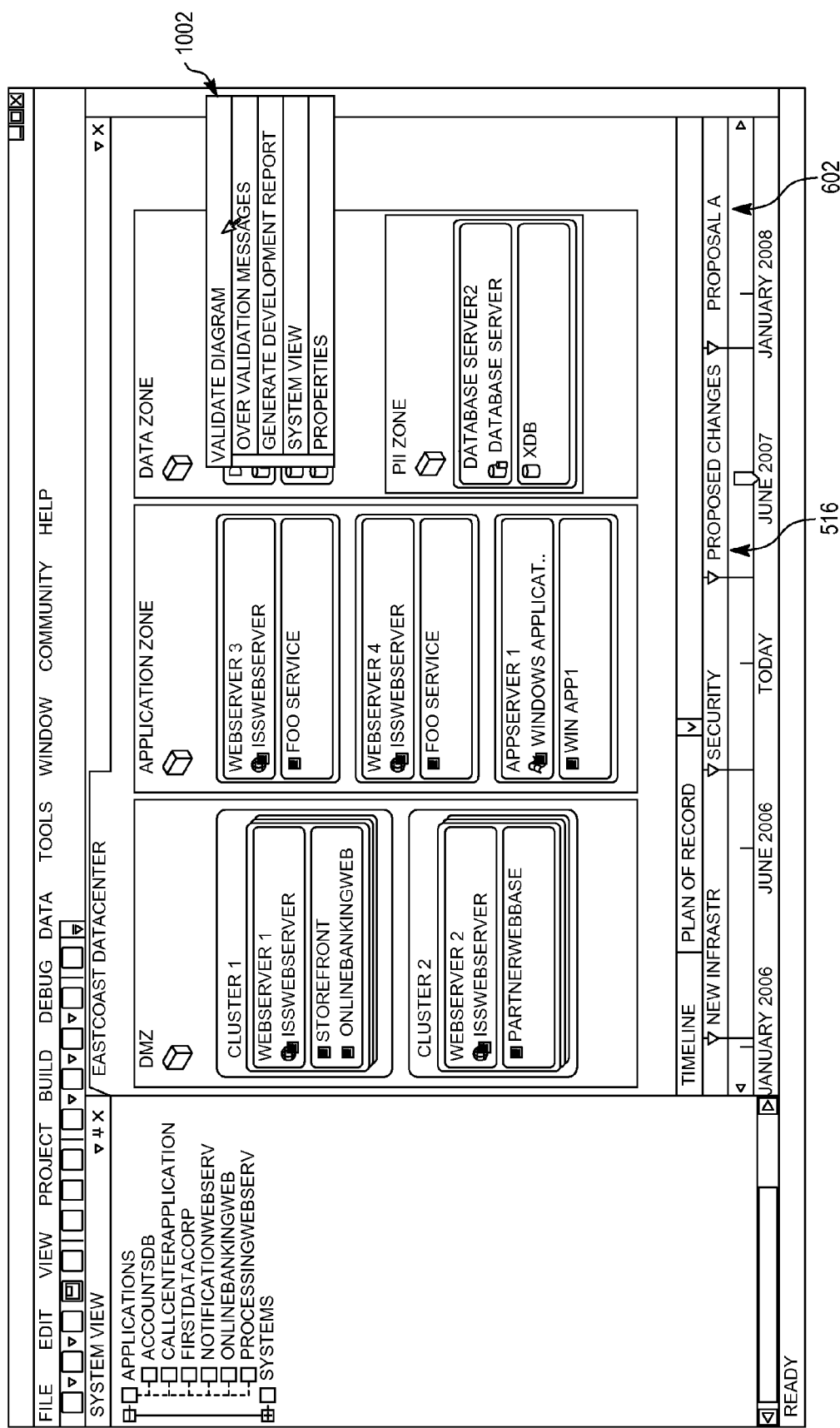

In FIG. 10, the user selects "Validate Diagram" from menu 1002 to validate proposed change order 602. In one embodiment, various tools 110 may subscribe to validation and are called when "Validate Diagram" is selected. The subscribed tools will apply their rules to the change order and provide any errors to the user via user interface 400. Thus, user interface 400 provides a single place for change orders to be validated against multiple tools and for a user to view the validation results.

Figure 11:
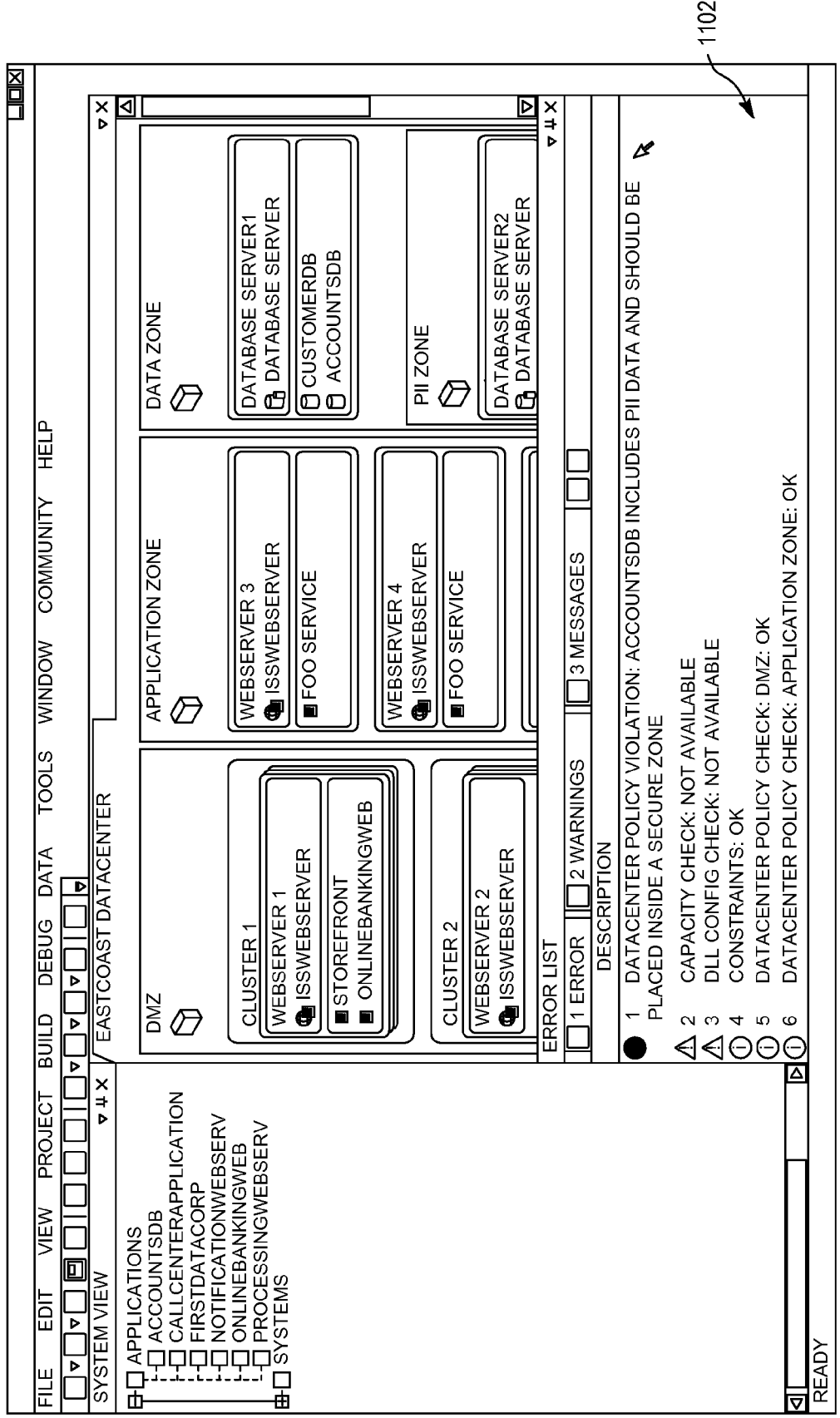

FIG. 11 shows the results of the validation at 1102. Results 1102 include 1 error, 2 warnings, and 3 messages. The error indicates that putting an AccountsDatabase outside of the PII Zone violates bank IT policy as policed by configuration manager 116. This policy requires any database having personal customer data be placed in PII Zone. The user can use user interface 400 to drag and drop the AccountsDatabase to the PII Zone as well as make any other revisions and then re-validate change order 602.

Embodiments herein consider change orders that are already scheduled for the future when adding a new change order to a change order plan. Process aware change management system 101 models the state of the view in the future based on scheduled change orders. It will be appreciated that at real-time when the user creates change order 602, PII Zone does not yet exist. It is only when the user moves slider 506 forward in time past change order 516 (that creates PII Zone) that PII Zone appears in view 502. As the user moves slider 506 forward, change aware system 101 applies the change orders in timeline 504 to view 502.

Embodiments herein may also be used for past time travel. Slider 506 may be moved to the past to show the state of view 502 in the past. In one instance, this may be used in an audit situation to prove changes were made in compliance with various requirements (e.g., ITIL practices, corporate requirements, governmental requirements, etc.).

Figure 12:
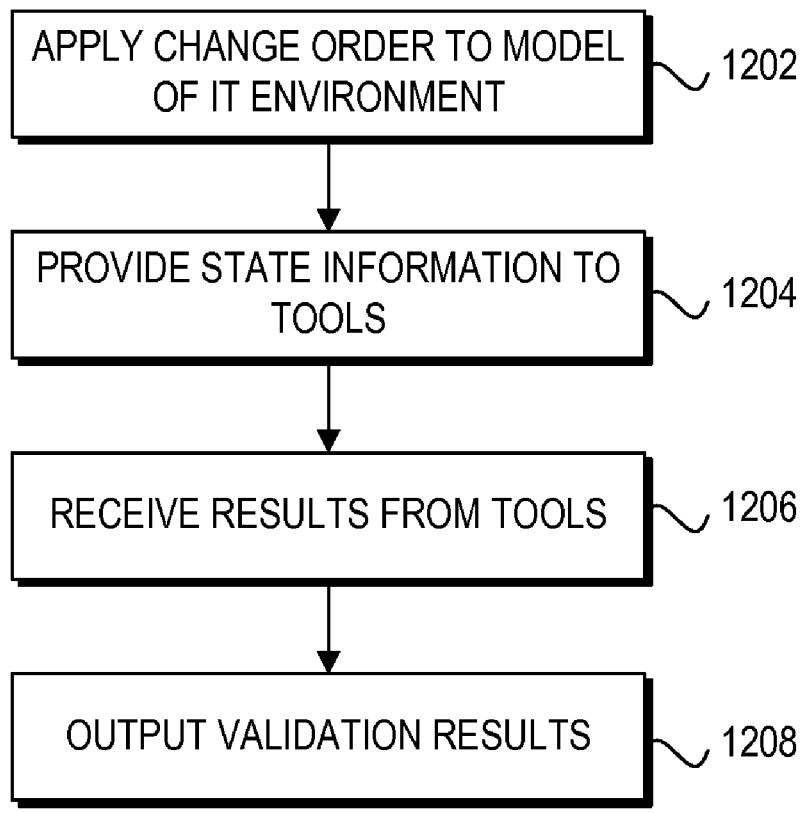
FIG. 12 is a flowchart showing operations of change order validation in accordance with an embodiment of the invention.

Turning to FIG. 12, a flowchart 1200 shows operations of change validation in accordance with an embodiment of the invention. In one embodiment, at least a portion of flowchart 1200 may be implemented by computer readable instructions executable by one or more computing devices. In one embodiment, validation module 104 may perform at least a portion of the operations of flowchart 1200.

Starting in operation 1202, change order information is extracted from the change order and applied to the CMDB model of the IT environment. This is a simulated execution of the change order at the scheduled time of execution of the change order. Next, in operation 1204, the state of objects and relationships after the simulated execution of the change order are provided to any subscribed tools 110. Continuing to operation 1206, results from tools 110 associated with validation are received. Next, in operation 1208, the results of the validation are output, such as displayed in UI 102, sent to a file, etc.

Detecting Breaks in Downstream Changes

When a change is inserted or revised, embodiments herein re-validate the plan(s) having the revised change to detect breaks in downstream changes from the revised change. Following dependencies between change order work items that are also stored in CMDB 114, change management system 101 returns all changes (change orders having status of In Process or Approved) that depend on the revised/inserted change. Every new change order that is created is made assuming that a change plan is executed. Thus, each change order declares an immediate dependency on a previous change order. The detection is done by running a set of validation tools 110 on a sandbox CMDB corresponding to the downstream change orders from the new versioned view. In one embodiment, the re-validation is performed automatically when a change is modified. In another embodiment, the re-validation is performed on all plans (e.g., Plan A, B, C) having the modified or inserted change.

Figure 13:
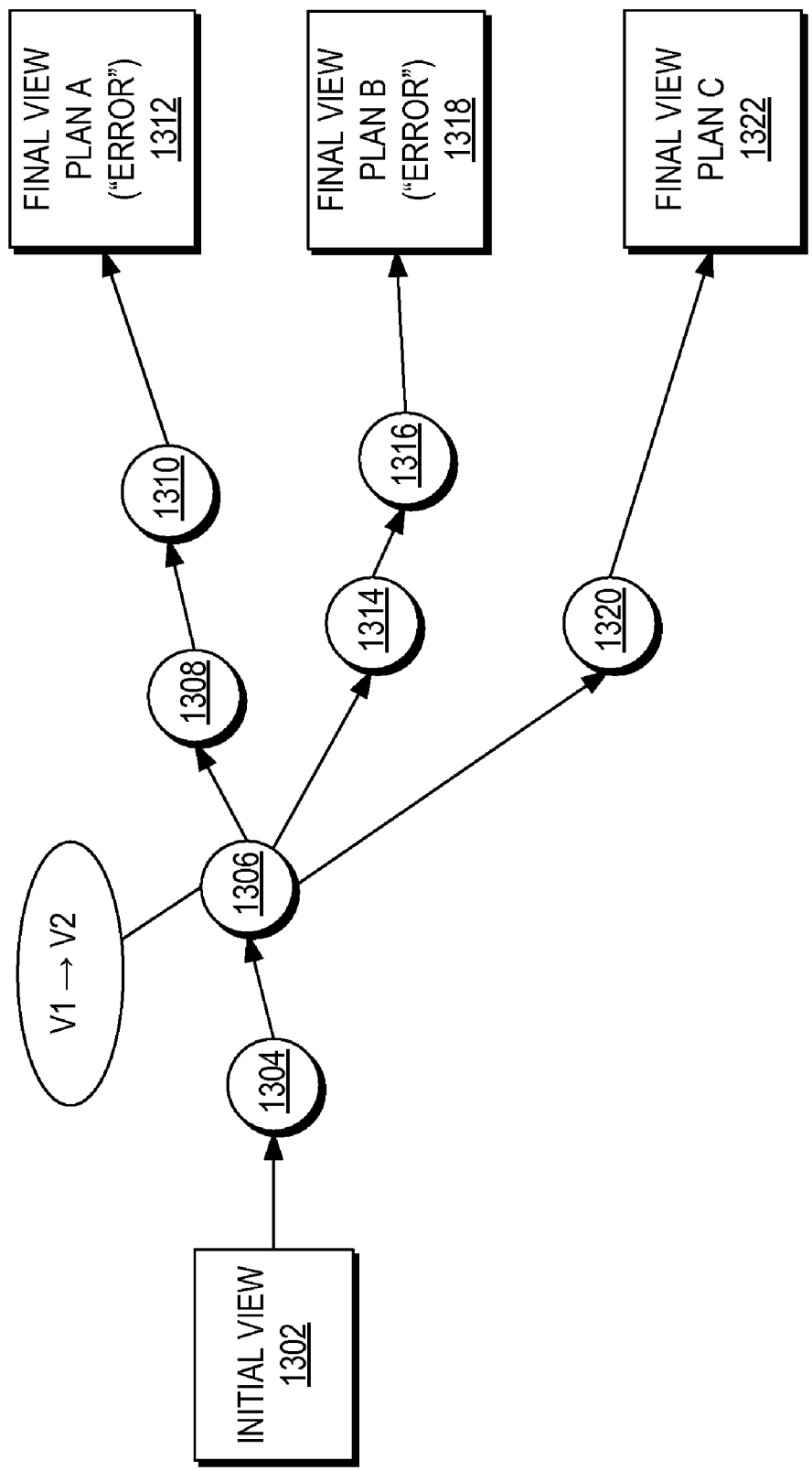
FIG. 13 is a block diagram of multiple plans and the downstream effects of an intermediate change in accordance with an embodiment of the invention.

An example of detecting breaks caused by reversioned changes is shown in FIG. 13. FIG. 13 shows an initial view 1302 of the IT environment. Initial view 1302 is modified via three branches (Plans A, B, and C). The Plan A branch includes changes 1304, 1306, 1308, and 1310 that depend on each other in a sequence and results in Final view Plan A at 1312. The Plan B branch includes changes 1304, 1306, 1314, and 1316 that depend on each other in a sequence and results in Final view Plan B at 1318. The Plan C branch includes changes 1304, 1306, and 1320 that depend on each other and results in Final view Plan C at 1322.

A user makes revisions to change 1306 from a version 1 (V1) to a version 2 (V2). The revisions to change 1306 causes process aware change management system 101 to automatically re-validate all the changes in the three branches downstream of change 1306. The re-validation finds that plans A and B are broken because of the versioning change of change 1306. For example, version 2 of change 1306 may cause a server to be uninstalled. However, change 1308 requires the use of this server to execute its change. Thus, Plan A has an error condition. The user is alerted of the errors to Plans A and B and that the modification to change 1306 caused the errors. The user may then make additional revisions (e.g., revise change 1306, revise changes upstream of change 1306, etc.) to correct the errors. When a change break is detected, a tree structure similarly as shown in FIG. 13 may be presented in UI 102 for displaying where the break occurred in the multiple change plans.

Referring to FIGS. 14-23, an example of detecting breaks in downstream changes is shown. This example continues the banking example as discussed in conjunction with FIGS. 4-11. In this example, GlobalBank has merged with another bank.

Figure 14:
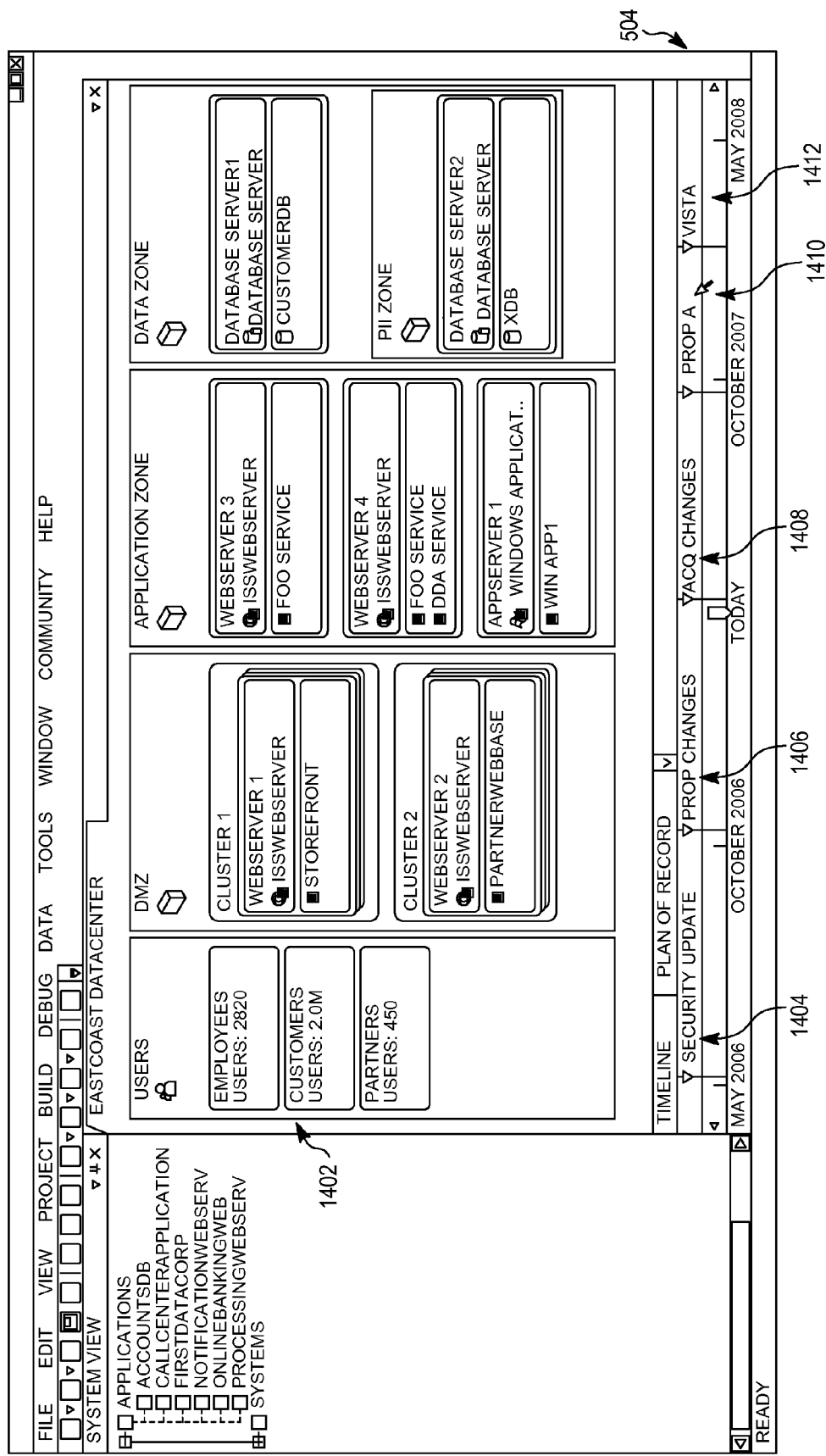
FIGS. 14-23 are user interfaces of a process aware change management system in accordance with an embodiment of the invention.

In FIG. 14, users associated with the merged bank are shown at 1402 and includes 2820 employees, 2.0 million banking customers, and 450 partners. Timeline 504 shows previously executed change orders 1404 and 1406, as well as future scheduled change orders 1408 and 1412. The user is currently creating new change order 1410 in response to the bank merger. It will be noted that on timeline 504, change order 1410 is being scheduled in between pre-existing changer orders 1408 and 1412.

Figure 15:
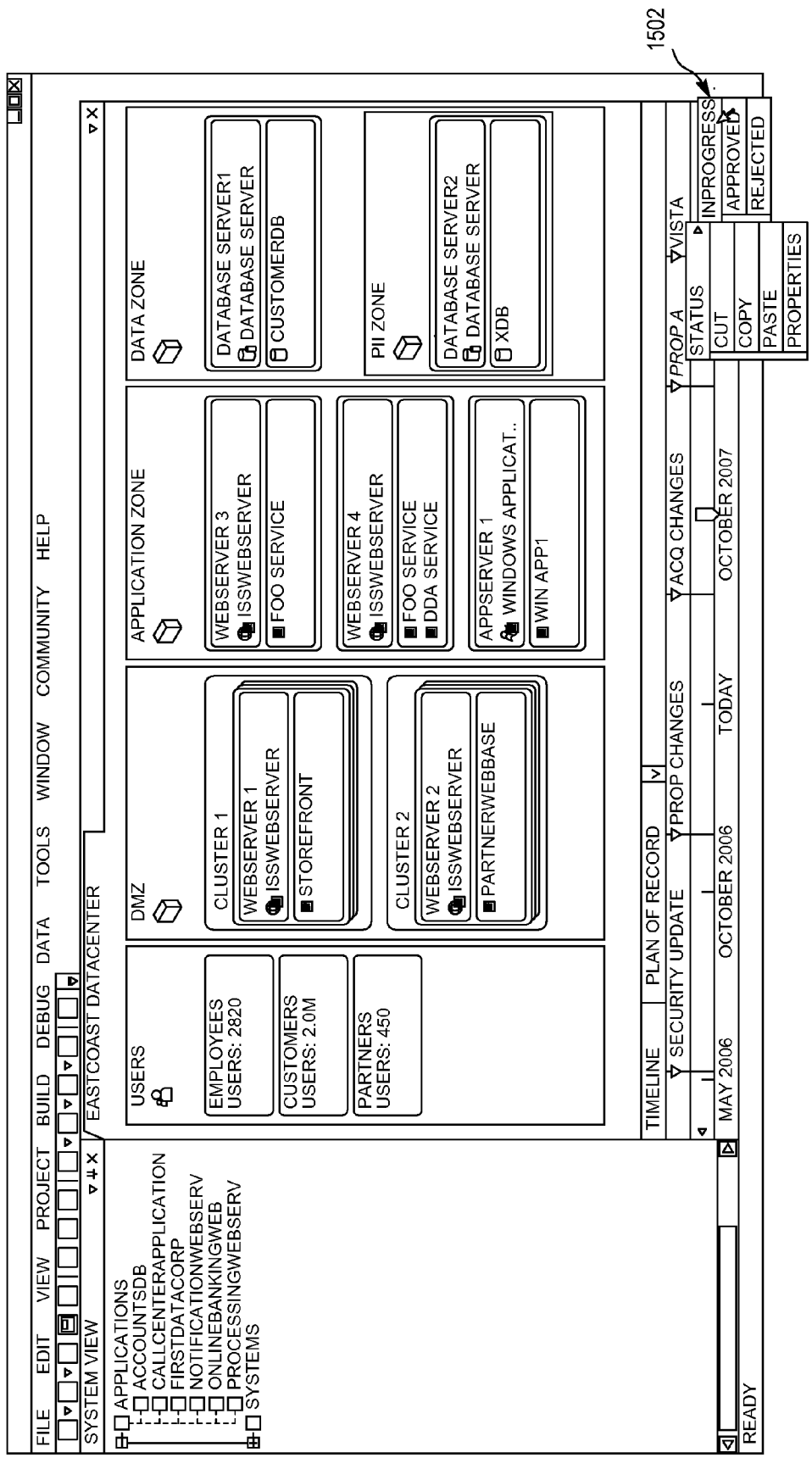

In FIG. 15, the user selects the status of new change order 1410 to "In Progress." For In Progress status, the change order will not execute in real-time at its currently scheduled time until the status is change to Approved, but the In Progress change is considered for simulation purposes such as validation and change break detection. Change order 1410 is shown in italics on timeline 504 to indicate that change order 1410 will not execute at the scheduled real-time unless its status is changed. The other menu options include "Approved" (the change order will execute as scheduled) and "Rejected" (the change order will not be executed but is retained for planning purposes; its status may be revised later).

Figure 16:
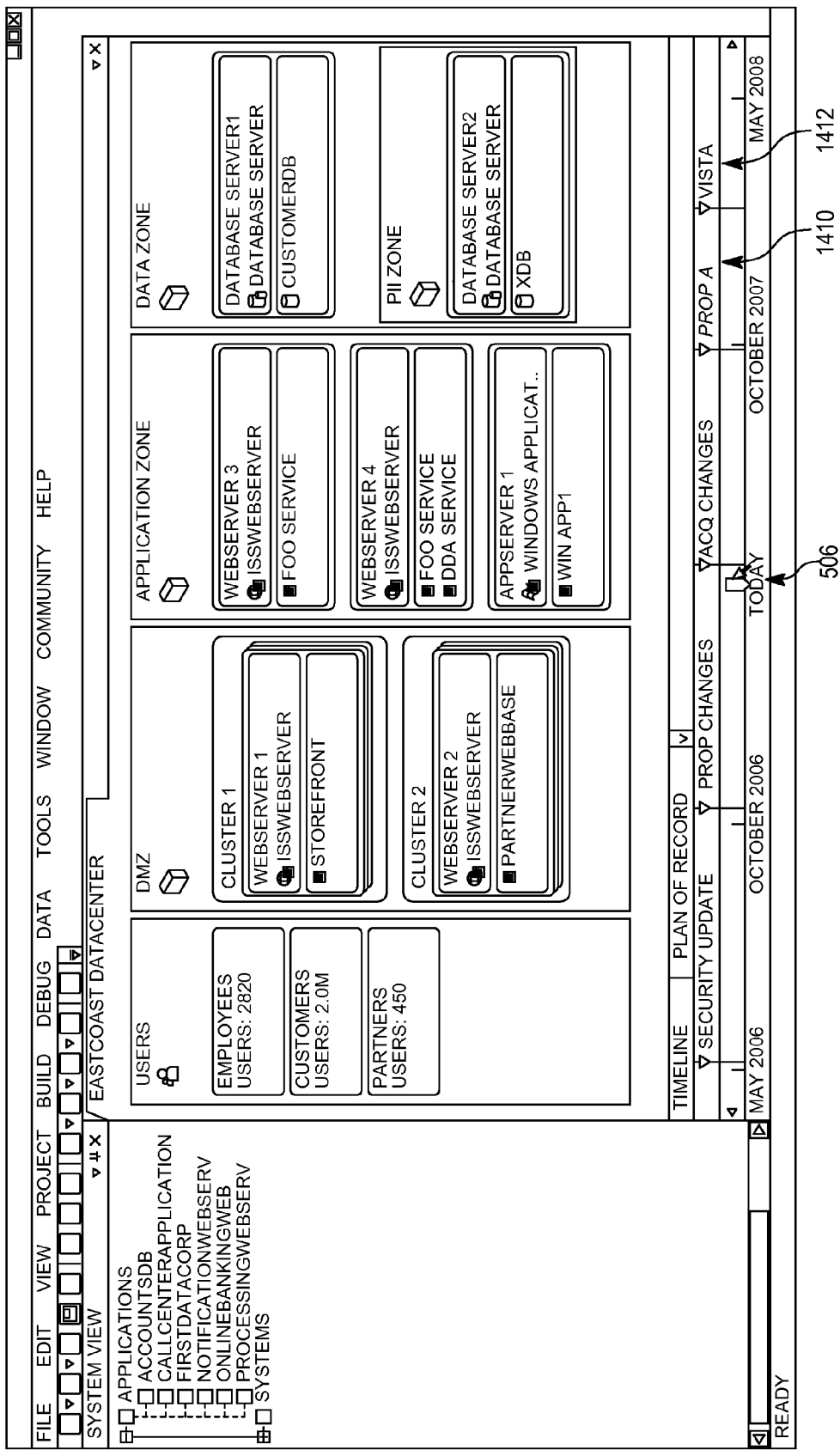
Figure 17:
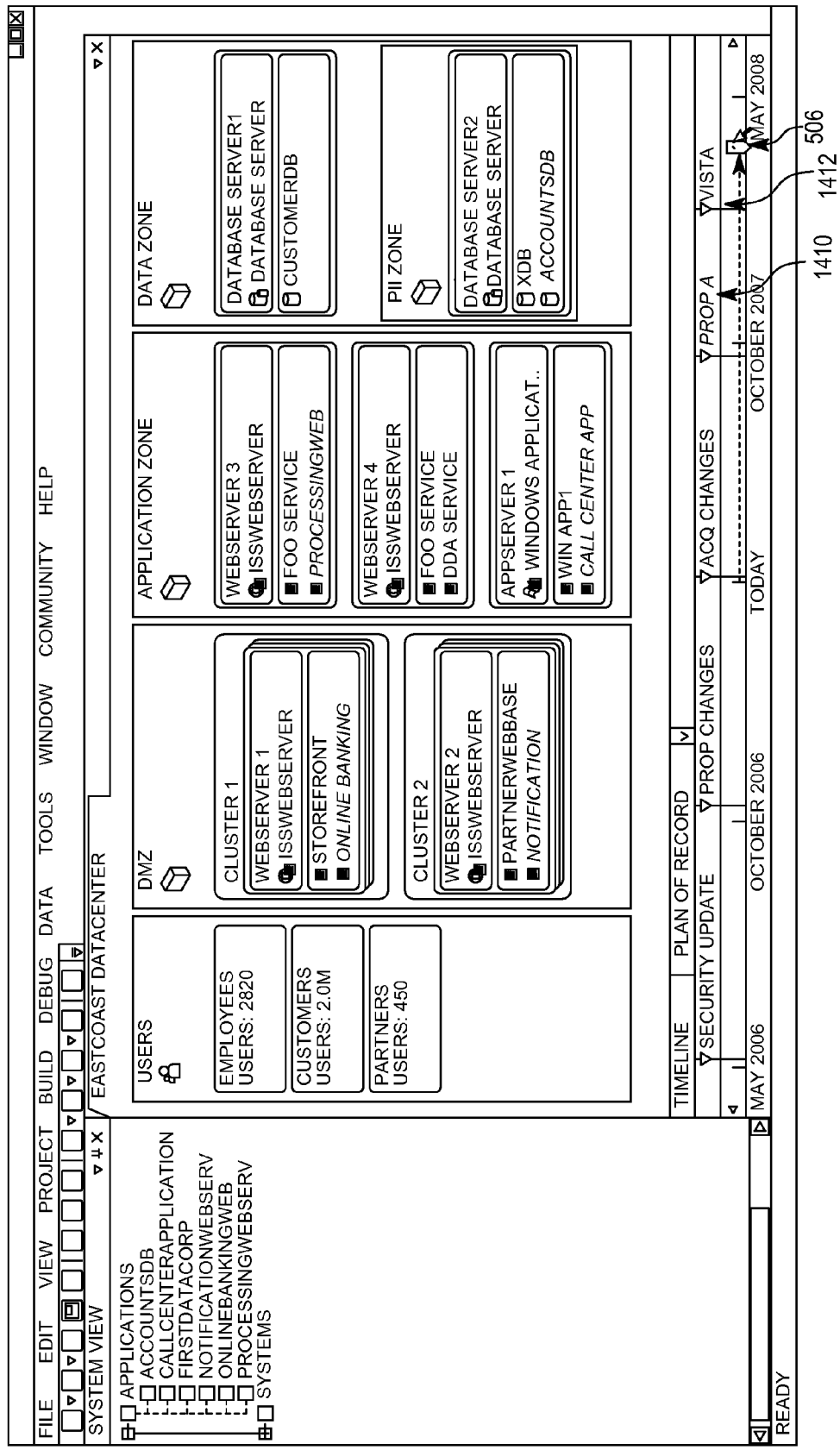

In FIGS. 16-17, slider 506 is moved forward and the scheduled change orders 1408 and 1412 get absorbed into the model. The changes to the view at the future time are shown in FIG. 17. In the DMZ, an OnlineBankingService was added to Cluster 1 and a NotificationService was added to Cluster 2. In the Application Zone, a ProcessingWebService was added to WebServer3 and CallCenterApp was added to ApplServer1. In the Data Zone, an AccountsDB was added to the PII Zone. Since change order 1410 has an In Progress status, the objects added by change order 1410 are also shown italicized in the view to indicate the In Progress status.

In FIG. 17, change management system 101 detects that downstream change order 1412 has become broken when change order 1410 occurs at its currently scheduled point on timeline 504. In one embodiment, the user is presented with an alert in UI 102. Also, a tree diagram showing the broken change orders, such as FIG. 13, is available to the user for viewing in UI 102.

Figure 18:
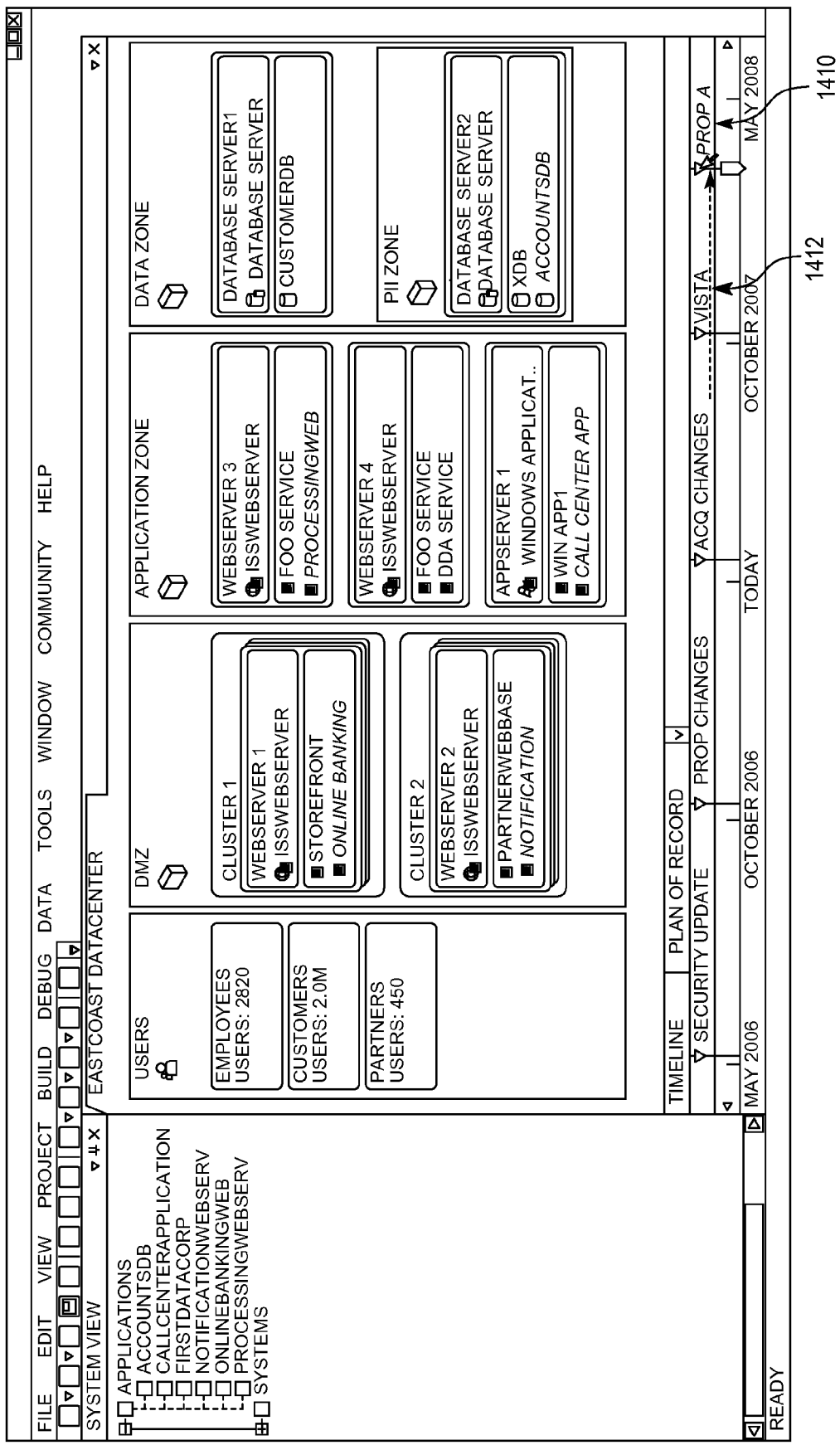
Figure 19:
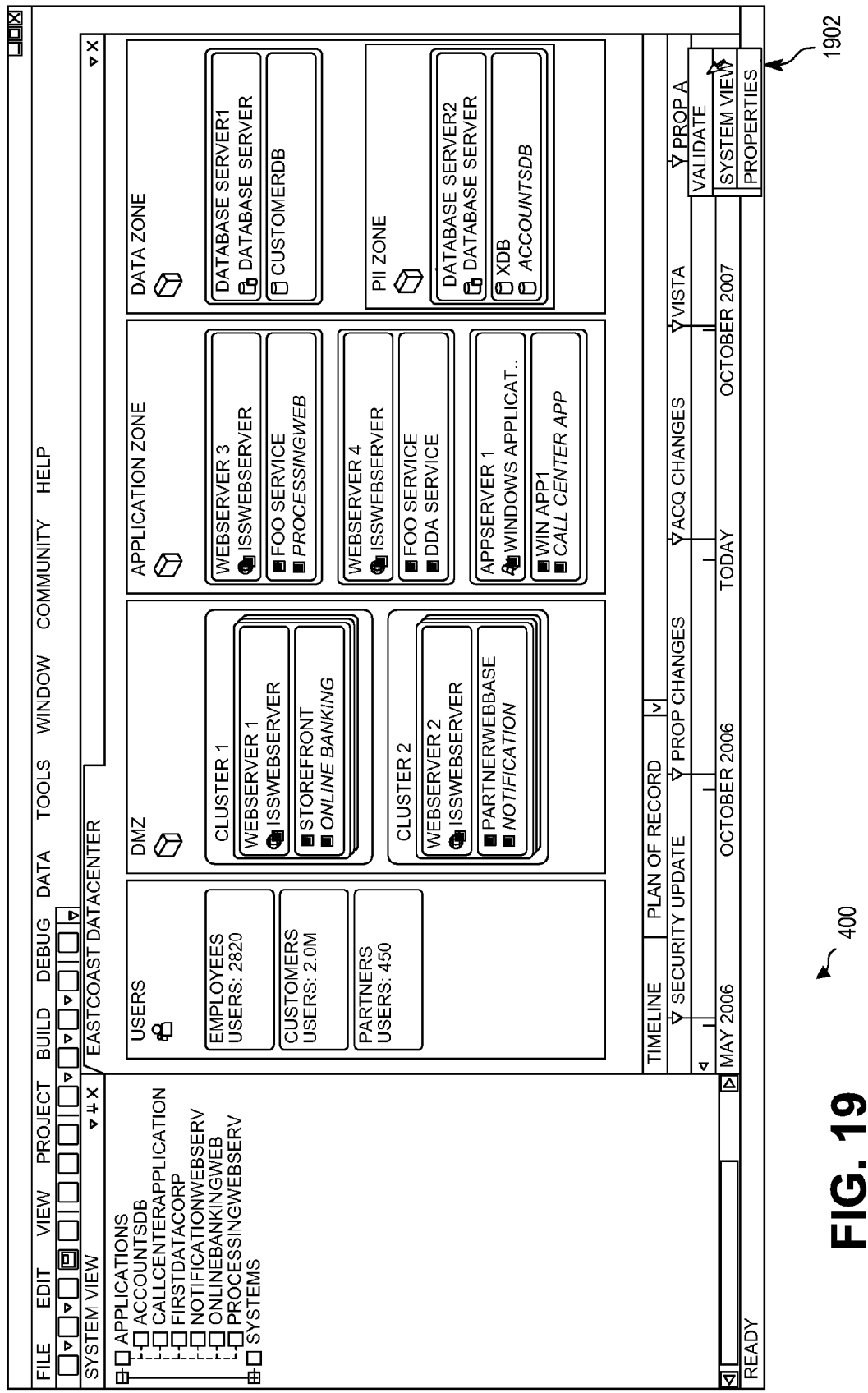

In FIG. 18, the user moves the new change order 1410 further into the future past change order 1412 to try and fix the break to change order 1412. In FIG. 19, the user uses menu 1902 to validate the current Plan of Record. Change orders with a state of Approved or In Progress (like new change order 1410) are considered for validation, but Rejected change orders are not considered.

Figure 20:
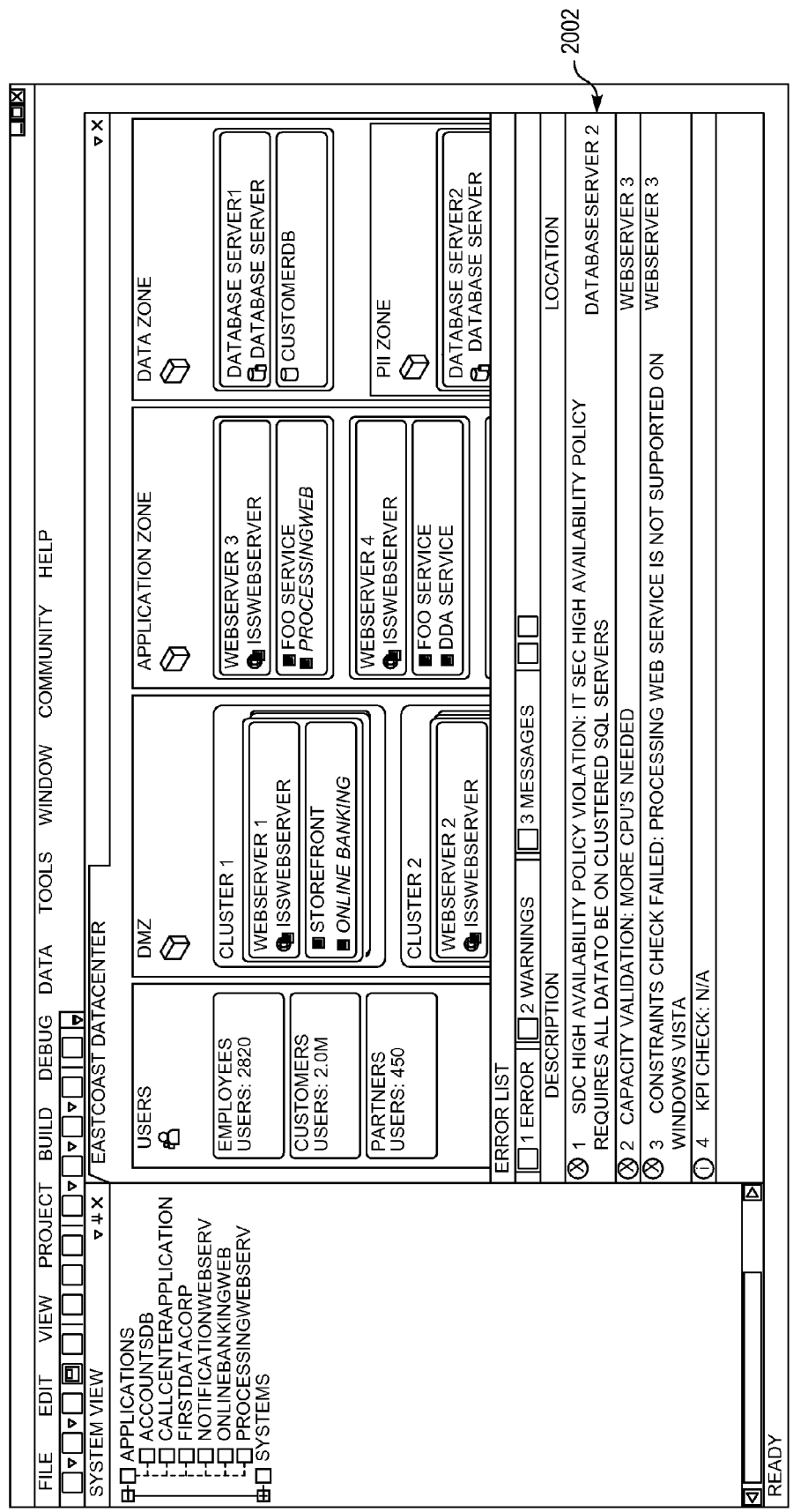
Figure 21:
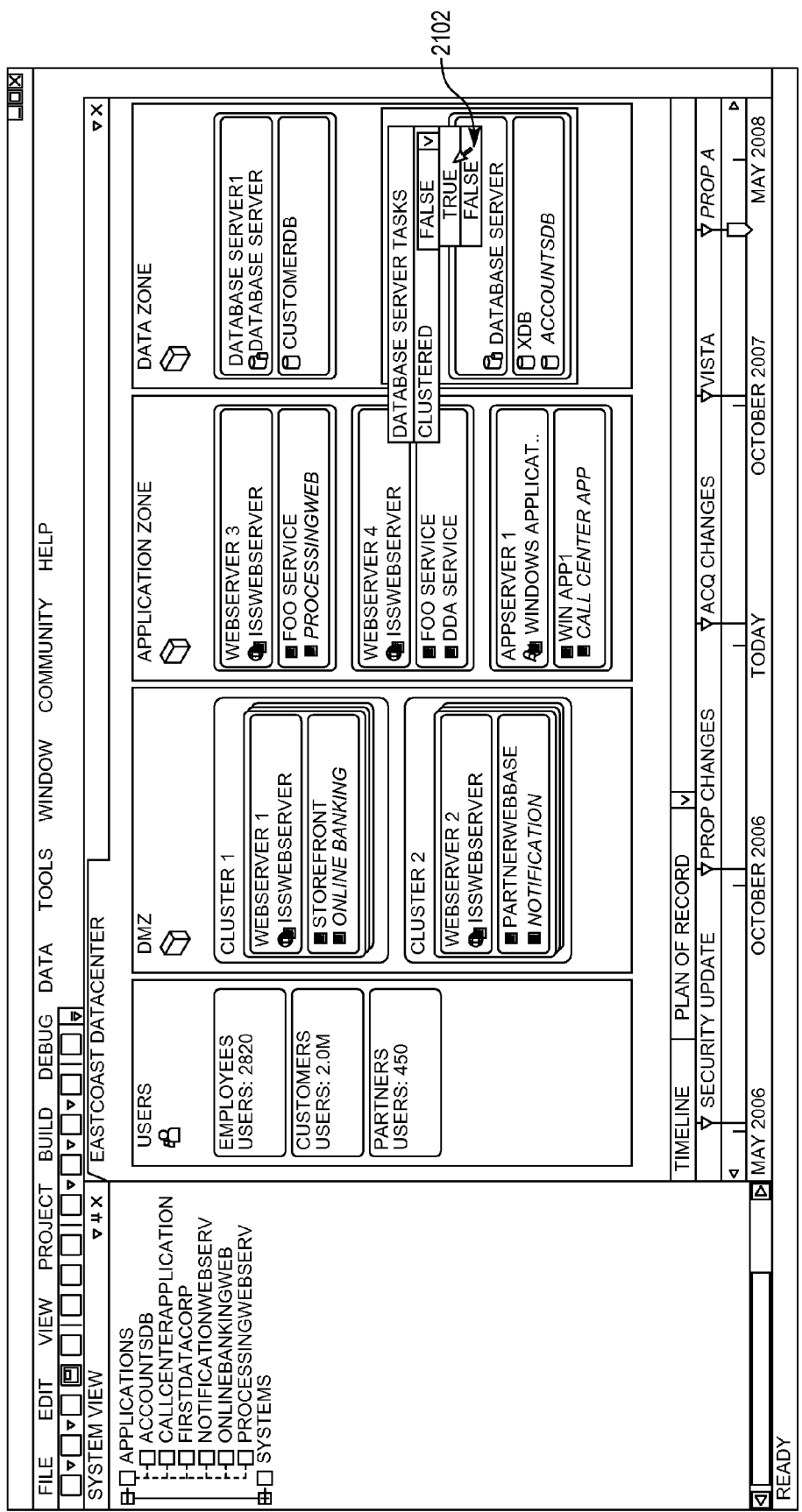

In FIG. 20, the validation results are shown at 2002. While change order 1412 is no longer broken, errors are shown for change order 1410. The validation results include an error that according to policy, data in the DataZone is to be on clustered SQL servers. In FIG. 21, the user revises change order 1410 in view of the validation results. For example, in FIG. 21, the user changes DatabaseServer2 to a clustered server using a pull-down menu 2102.

Figure 22:
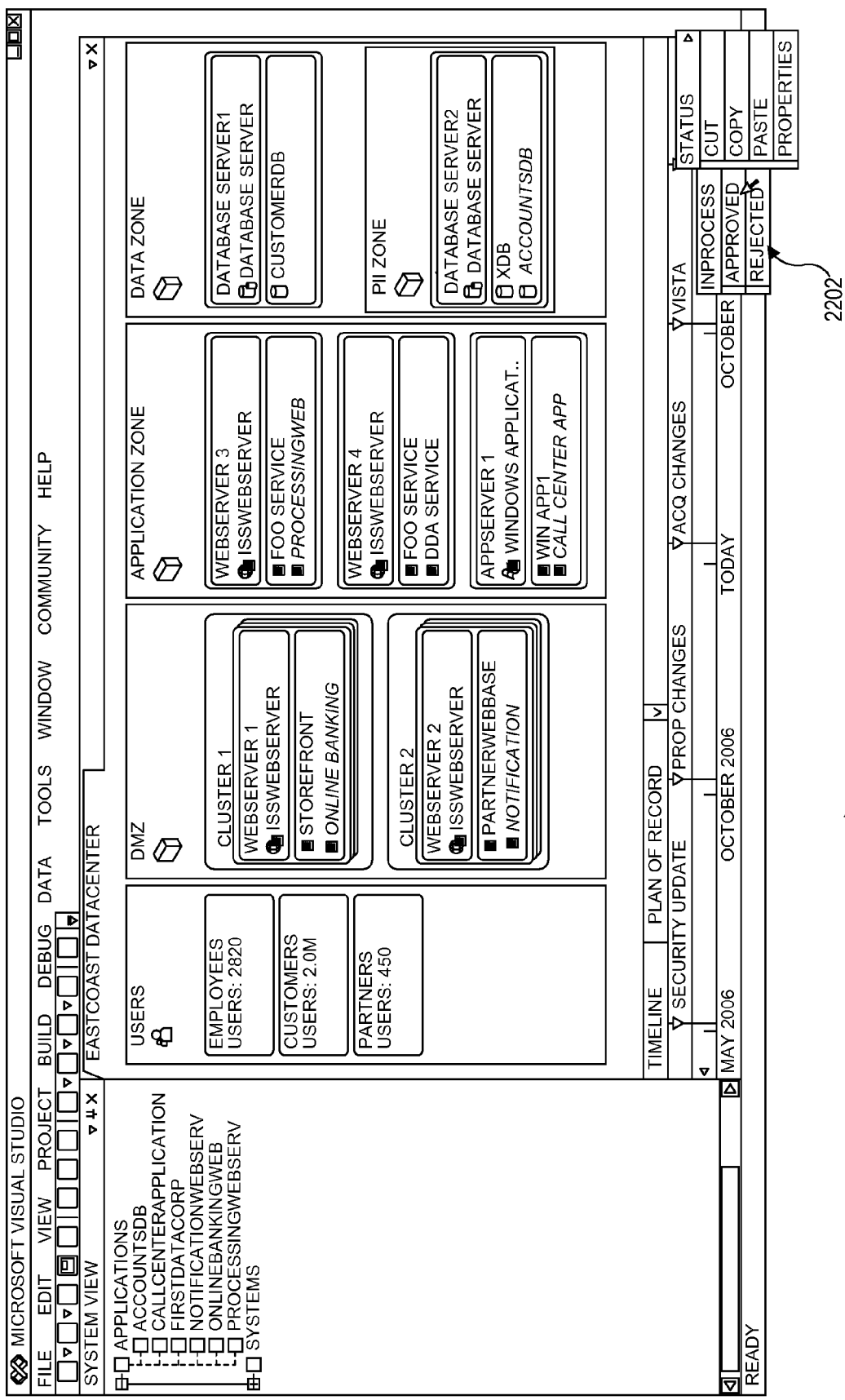
Figure 23:
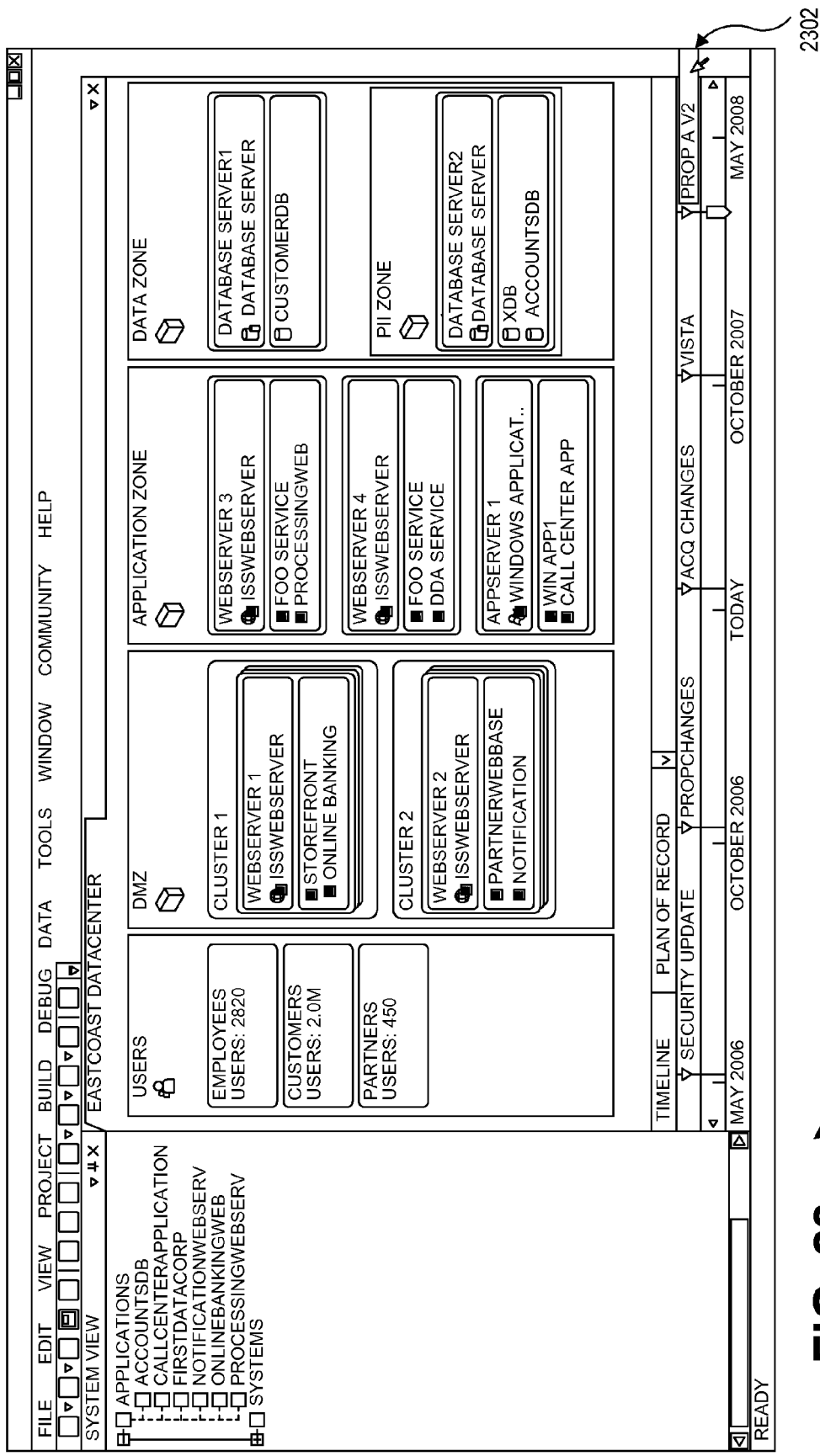

In FIG. 22, the user changes the state of change order 1410 from In Progress to Approved using menu 2202. The appearance of change order 1410 in timeline 506 changes from italicized to solid to indicate the Approved status. In FIG. 23 at 2302, the user renames change order 1410 to "V2" for version 2 and saves the changes.

Figure 24:
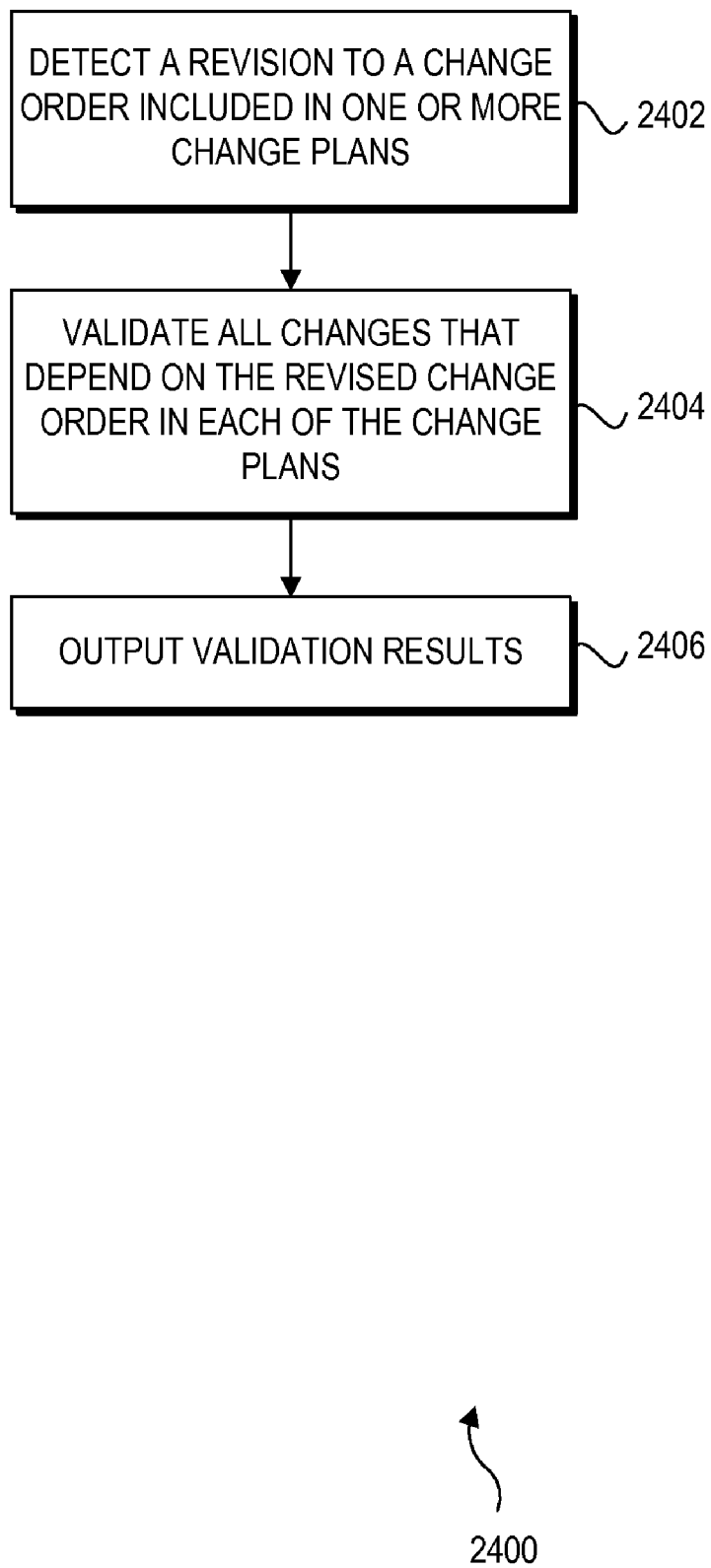
FIG. 24 is a flowchart showing operations of detecting breaks in downstream changes in accordance with an embodiment of the invention.

Turning to FIG. 24, a flowchart 2400 shows operations of detecting downstream broken changes in accordance with an embodiment of the invention. In one embodiment, at least a portion of flowchart 2400 may be implemented by computer readable instructions executable by one or more computing devices. In one embodiment, break detection module 106 may perform at least a portion of the operations of flowchart 2400.

Starting in operation 2402, a revision to a change order in one or more change plans is detected. A revision may include a modification of pre-existing change order (e.g., version 1 to version 2), or insertion of a new change order before a pre-existing change order.

Next, in operation 2404, all changes that depend on the revised change order (i.e., downstream change orders) are re-validated. This re-validation is done in all change plans that include the revised change order. The re-validation may be initiated automatically or manually be a user. A change order depends on a revised changed order, if the change order it declares dependency on is that revised change order or is downstream from that revised change order in a chain of dependencies. In one embodiment, the dependency between change orders is declared when creating a change order. A previous set of change orders chain together before the new change order.

Continuing to operation 2406, the validation results are output. The user may be alerted through UI 102 that one or more downstream change orders in one or more change plans now have errors due to the revision of the change order.

Determining Side Effects of Executing a Change Order

Embodiments of process aware change management system 101 may perform "during change" impact analysis. This analysis determines the side effects of executing the change order at the scheduled time. In one embodiment, the side effects are found based on root cause analysis.

ROOT CAUSE ANALYSIS: System management software (e.g., Microsoft® System Center) may include models for the domains managed. It may also include rules to discover the objects and relationships and logic to detect the state of various aspects of these entities (machines, services, jobs, etc.). Operations manager 118 may perform discovery and state keeping; this gathered information is sent to CMDB 114 and an Operations Manager store.

The models may also include causality models. A causality model declares the "causes" of "effects" that can be associated with a managed entity type and knowledge around diagnosing it. Causes are typically conditions that are not observed directly like monitors, but inferred from the state of monitors (i.e., the effects). The cause and monitor states are associated with each other with causality rules that use the relationships in the model to declare what monitors are tripped (i.e., rendered true) by what causes. These can be a one to many as well as cascading relationship. As discussed further below, this same causality knowledge may be used to perform "impact while changing" analysis (i.e., determining side effects).

In order to employ the causality rules, state information is gathered at snapshot points in time. At any given time, a snapshot of the IT environment provides monitor state data. Based on this information, the certainty of a cause to be true is computed for all causes. Weights provided in the causality models may be used in this computation. For example, if A causes B and C, and if both B and C are true, A is given a high certainty to be true. If both B and C are untrue, A is given a high probability of being untrue. If B is true and C is untrue, the certainty depends on the individual causal probabilities, false positive probabilities, and so on.

Causality rules for these monitors will be allowed to point to causes associated with policy or workflow failures that may cause the true states of these monitors. For example, computers can have monitors that indicate "Self configuration management for Patches timed out". Causality rules will list out what causes can cause this monitor indication (i.e., effect). In this case, this monitor points to the "approval-to-reboot workflow" (i.e., the computer needs to be rebooted before Patches can execute). When many issues point to the same policy or workflow cause, root cause analysis will surface it as the thing to investigate.

Figure 25:
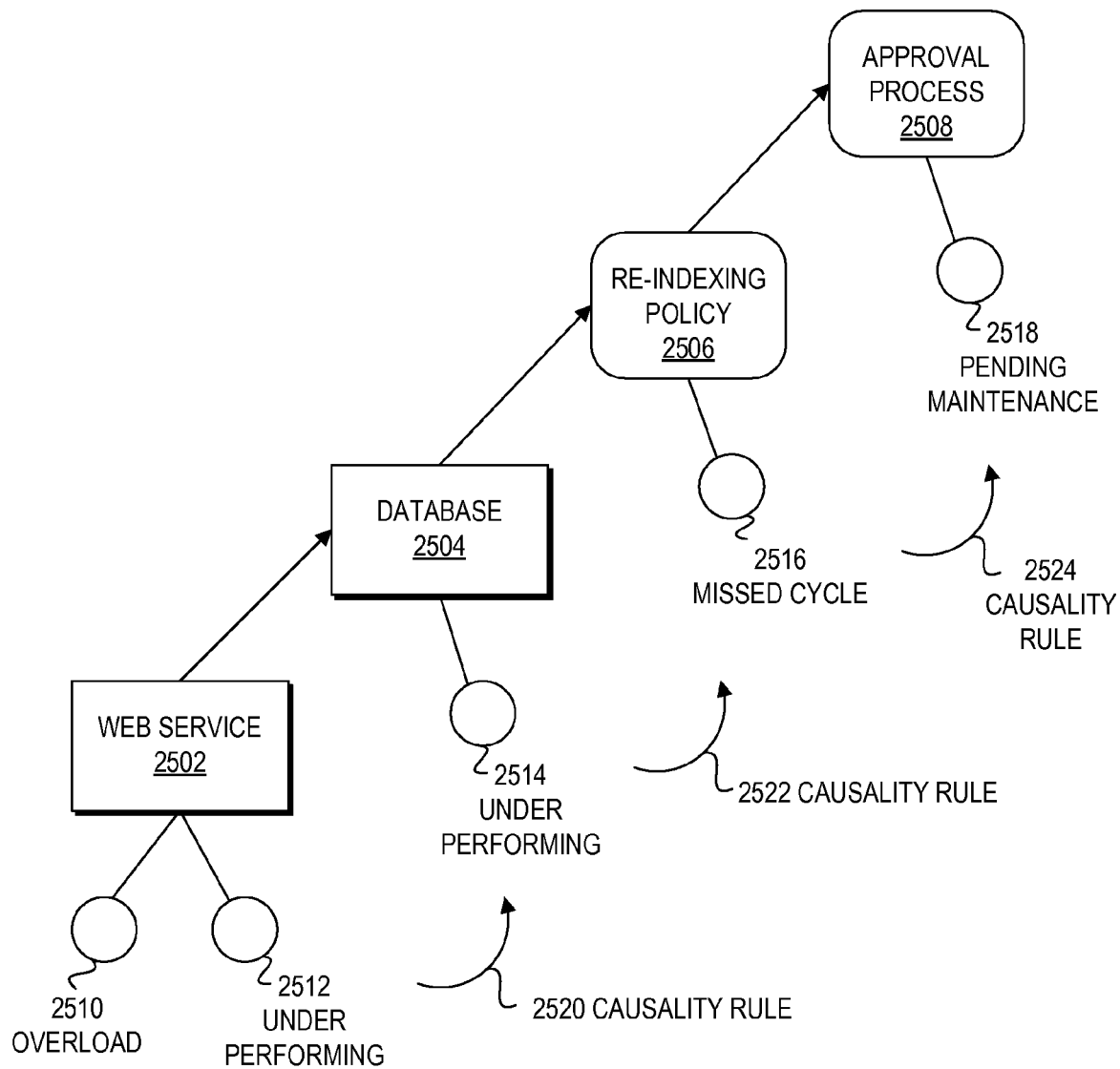
FIG. 25 is a block diagram of using causality rules in accordance with an embodiment of the invention.

FIG. 25 shows an example of applying causality rules. Relationships between entities in FIG. 25 are as follows. A web service 2502 has monitors overload 2510 (e.g., service requests above a threshold) and underperforming 2512 (e.g., service response time above a threshold). To fulfill service requests, Web service 2502 accesses database 2504. Database 2504 has an underperforming monitor 2514 (e.g., database transaction times above a threshold).

Database 2504 is managed by a re-indexing self management policy 2506 (e.g., database 2504 is re-indexed once a week to maintain optimal performance). Policy 2506 has a monitor of missed re-index cycle 2516. Policy 2506 is managed by an approval process 2508 that has a pending scheduled maintenance monitor 2518 (e.g., scheduled maintenance is not started until approved by a human system administrator).

FIG. 25 also includes causality rules 2520, 2522, and 2524. Rule 2520 shows that underperforming monitor 2512 can be rendered true when monitor 2514 indicates database 2504 is underperforming. Rule 2522 indicates that database underperforming monitor 2514 may be true when an indexing cycle is missed at re-indexing policy 2506. And causality rule 2524 indicates that missed cycle monitor 2516 may be tripped because scheduled maintenance is pending approval by a system administrator at approval process 2508 as indicated by pending maintenance monitor 2508.

Thus, following the causality rules in FIG. 25 from rule 2520 to rule 2522 to rule 2524, the root cause analysis determines that a likely cause of the underperforming monitor 2512 being tripped is the pending scheduled maintenance monitor 2518 at approval process 2508. For example, the system administrator in charge of monitor 2518 is on vacation. Another system administrator may take this root cause analysis and confirm whether maintenance is pending approval at process 2508 and take action as needed.

TEMPORARY IMPACT OF ENACTING A CHANGE ORDER: As discussed above in the anatomy of a change order, the change order provides a CMDB query to determine which "causes" will become true during the change. The causality rules are applied in reverse to determine which component monitors will also become true as a result. Health causality rules are applied to see which services and business processes will be affected. Also, SLA causality rules are applied to determine scheduling so as not to affect SLAs and notifications are sent to appropriate people regarding the side effect.

Figure 26:
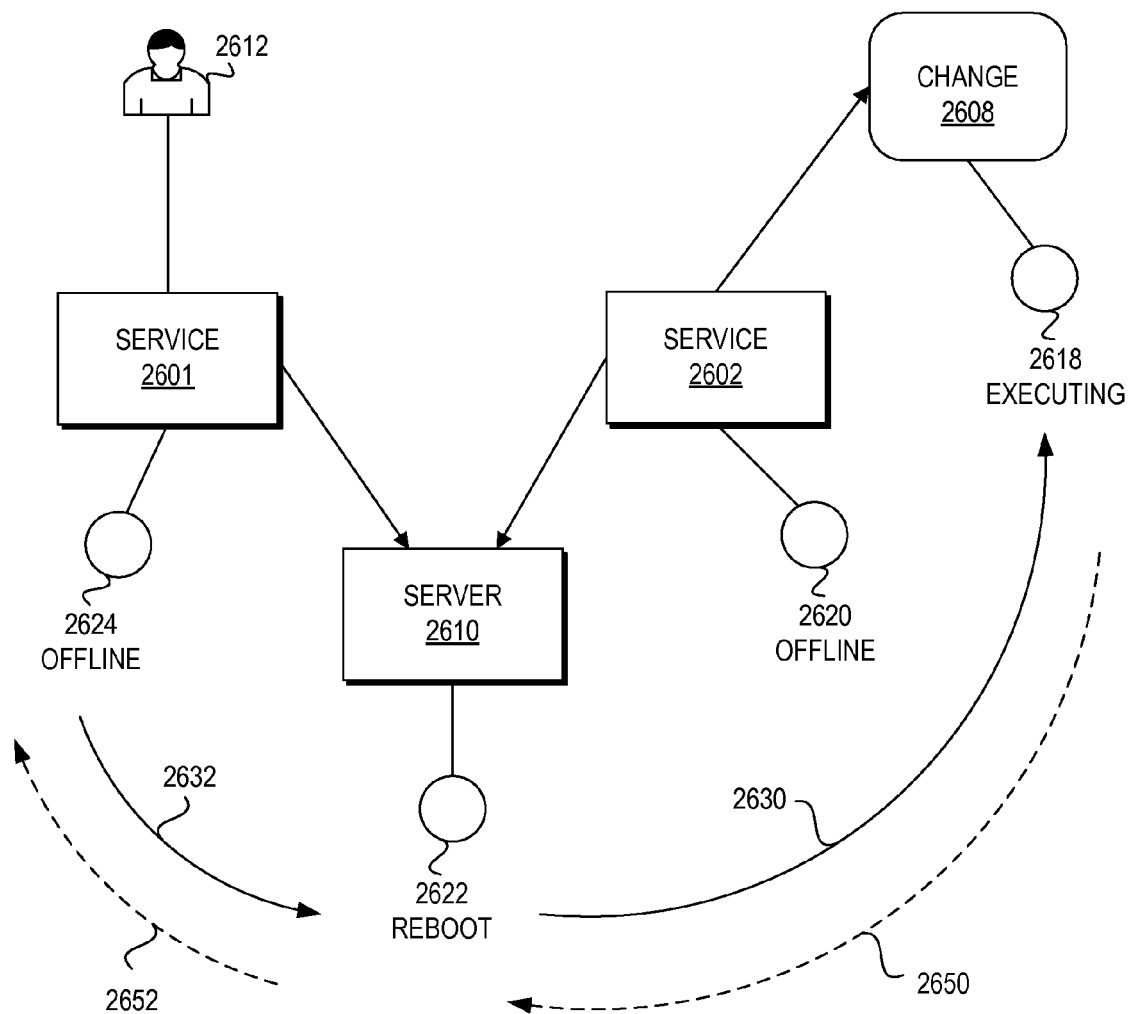
FIG. 26 is a block diagram of using causality rules for determining side effects of executing a change in accordance with an embodiment of the invention.

Referring to FIG. 26, an example of applying causality rules in reverse for predicting side effects of executing a change is shown. Server 2610 hosts service 2601 and service 2602. Service 2602 is managed by change process 2608. Server 2610 has a reboot monitor 2622 (e.g., rendered true when server rebooting). Service 2601 has offline monitor 2624 and service 2602 has offline monitor 2620 (e.g., indicates when the service is offline and thus unavailable). Change process 2608 includes executing monitor 2618 (e.g., monitor rendered true when change process 2608 is executing). Change process 2608 is an upgrade to service 2602.

Causality rule 2630 indicates that a cause of server 2610 rebooting is the execution of change process 2608 (the upgrade requires that server 2610 be rebooted). Causality rule 2632 indicates that a cause of service 2601 being offline is server 2610 being rebooted. Since the cause is known (i.e., execution of change process 2608), causality rules 2630 and 2632 can be followed backwards (shown at 2650 and 2652) to reach offline monitor 2624. Thus, a side effect of executing change process 2608 is that service 2601 will be knocked offline temporarily.

In one embodiment, the logic determines that a side effect of a change order has been reached when the object reached by following a causality rule backwards is not an entity (e.g., object) defined in the change order. Causality rules can fan out as they are traced backwards. As the logic hits causes or effects (monitors) associated with other entities, these other impacted entities are side effects. It is assumed that the managed entity on which the change is being executed is going to be temporarily impacted; side effect determination is looking for other unintended impact.

Once the system administrator knows the side effects of a change order, the change order can be scheduled to minimize the side effects. For example, in FIG. 26, change process 2608 can be scheduled at night, during a normal maintenance cycle when service 2601 is offline anyway, etc. With knowledge that service 2601 will be offline, a targeted notification (e.g., email message) can be sent to user 2612 of service 2601 of the service outage (discussed further below). User 2612 can schedule around this outage or perhaps work with the system administrator to reschedule change process 2608. For user 2612, a notification that service 2601 will be offline is much more meaningful than a notification that server 2610 will be offline because user 2612 may have no idea what services are hosted by server 2610. In one embodiment, a notification is automatically generated by change management system 101 and sent to user 2612.

One skilled in the art having the benefit of this description will appreciate that the example in FIG. 26 is using root cause analysis to discover side effects of a scheduled change (i.e., looking to the future), while the example in FIG. 25 uses root cause analysis to discover the cause of various effects that have already occurred (i.e., looking to the past). In FIG. 26, the root cause is known (i.e., change process 2608) and following the causality rules backwards finds the side effects (e.g., service 2601 knocked offline). The root cause is known and the logic determines the effect(s) as opposed to following all the effects to find the root cause. Also, the causality rules that already exist for use in causality analysis may be used for determining side effects for impact analysis of executing a change order.

Also, in some conventional implementations, a conservative approach is taken to schedule changes (even changes that have little or no side effects) using rigid rules (e.g., all changes must occur on Weekends). This is because the system administrators have no way to reliably determine change side effects, so the change is scheduled for a time of least impact in case some severe side effect occurs. For example, all human resources services will be offline Saturday night even though the change has no side effects and could be scheduled during normal work hours. Embodiments herein enable system administrators to schedule changes more efficiently by using the causality rules to determine side effects.

Knowledge of side effects may also be used for spam control of email notices of interruptions to IT resources. Embodiments herein may be used for automated targeted notifications of change impact on the IT environment. Embodiments herein do not use a general broadcast to users with information meaningless to users. Constant broadcasts of IT outages/changes tend to overwhelm users such that the users start to ignore the notifications and miss notifications that actually affect them.

Figure 27:
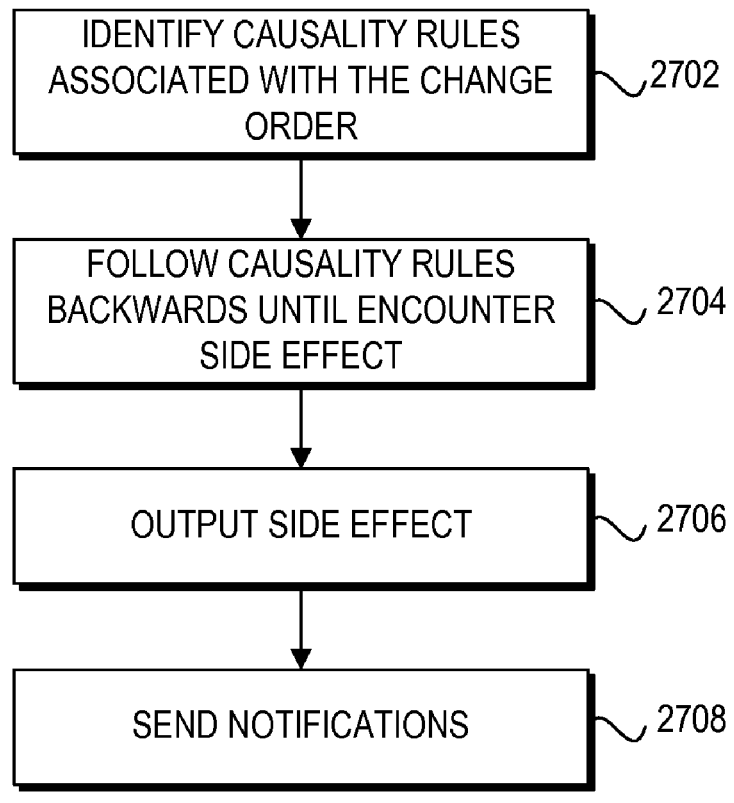
FIG. 27 is a flowchart showing operations of determining side effects of a change order in accordance with an embodiment of the invention.

Turning to FIG. 27, a flowchart 2700 shows operations of determining side effects of a change in accordance with an embodiment of the invention. In one embodiment, at least a portion of flowchart 2700 may be implemented by computer readable instructions executable by one or more computing devices. In one embodiment, side effects module 108 may perform at least a portion of the operations of flowchart 2700.

Starting in operation 2702, the causality rules associated with the change order are identified. In one embodiment, the change process temporary impact query of the change order is used. Next, in operation 2704, the causality rules are followed backwards until a side effect is encountered, where a causality rule defines a cause of a change of state at an object.

Continuing, in operation 2706, the side effect is output, such as displayed in UI 102. In one embodiment, a user selects a side effect button in UI 102 to display the side effects for a selected change order. Next, in operation 2708, notifications are sent to users affected by the side effect.

Example Computing Device

Figure 28:
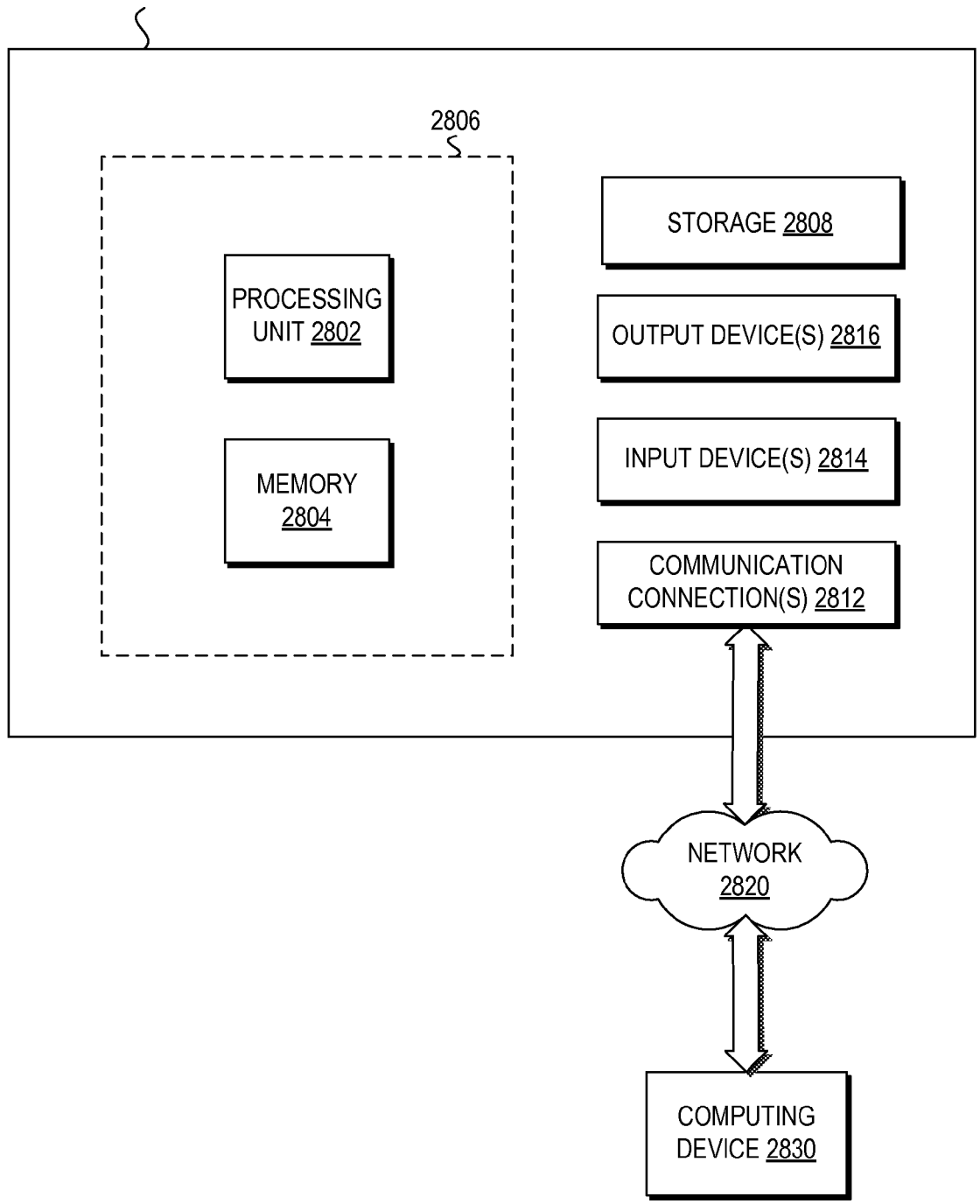
FIG. 28 is a block diagram of an example computing device for implementing embodiments of the invention.

FIG. 28 and the following discussion provide a brief, general description of a suitable computing environment to implement embodiments of the invention. The operating environment of FIG. 28 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 28 shows an example of a computing device 2800 for implementing one or more embodiments of the invention. In one configuration, computing device 2800 includes at least one processing unit 2802 and memory 2804. Depending on the exact configuration and type of computing device, memory 2804 may be volatile (such as RAM), non-volatile (such as ROM, flash memory, etc.) or some combination of the two. This configuration is illustrated in FIG. 28 by dashed line 2806.

In other embodiments, device 2800 may include additional features and/or functionality. For example, device 2800 may also include additional storage (e.g., removable and/or non-removable) including, but not limited to, magnetic storage, optical storage, and the like. Such additional storage is illustrated in FIG. 28 by storage 2808. In one embodiment, computer readable instructions to implement embodiments of the invention, such as change management system 101, may be in storage 2808. Storage 2808 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 2804 and storage 2808 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 2800. Any such computer storage media may be part of device 2800.

Device 2800 may also include communication connection(s) 2812 that allow device 2800 to communicate with other devices. Communication connection(s) 2812 may include, but is not limited to, a modem, a Network Interface Card (NIC), an integrated network interface, a radio frequency transmitter/receiver, an infrared port, a USB connection, or other interfaces for connecting computing device 2800 to other computing devices. Communication connection(s) 2812 may include a wired connection or a wireless connection. Communication connection(s) 2812 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 2800 may include input device(s) 2814 such as keyboard, mouse, pen, voice input device, touch input device, infrared cameras, video input devices, and/or any other input device. Output device(s) 2816 such as one or more displays, speakers, printers, and/or any other output device may also be included in device 2800. Input device(s) 2814 and output device(s) 2816 may be connected to device 2800 via a wired connection, wireless connection, or any combination thereof. In one embodiment, an input device or an output device from another computing device may be used as input device(s) 2814 or output device(s) 2816 for computing device 2800.

Components of computing device 2800 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 2800 may be interconnected by a network. For example, memory 2804 may be comprised of multiple physical memory units located in different physical locations interconnected by a network.

In the description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 2830 accessible via network 2820 may store computer readable instructions to implement one or more embodiments of the invention. Computing device 2800 may access computing device 2830 and download a part or all of the computer readable instructions for execution. Alternatively, computing device 2800 may download pieces of the computer readable instructions, as needed, or some instructions may be executed at computing device 2800 and some at computing device 2830. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
 receiving a change order to be executed at a scheduled time, wherein the received change order is included in both a first change plan and a second change plan and the received change order defines a change to an Information Technology (IT) environment;
 validating the received change order against validation rules to simulate execution of the received change order at the scheduled time;
 detecting a revision to the received change order resulting in a revised change order;
 responsive to detecting the revision, re-validating at least:
  one or more first change orders that are downstream of the revised change order in the first change plan, and
  one or more second change orders that are downstream of the revised change order in the second change plan; and
 outputting results of the re-validating,
 wherein the re-validating comprises detecting breaks in the one or more first change orders that are downstream of the revised change order in the first change plan or the one or more second change orders that are downstream of the revised change order in the second change plan,
 wherein the received change order includes:
  a change workflow including machine readable instructions for executing the received change order;
  a change update query including one or more queries that, when applied to a model of the IT environment, update one or more states of objects and relationships in the model to reflect execution of the received change order; and
  a change process temporary impact query that returns causes that will become true when the received change order is enacted, and
 wherein at least the re-validating is performed by a computing device.

2. The method of claim 1 wherein validating the received change order includes:
 extracting information from the received change order;
 applying the received change order to the model of the IT environment to update the one or more states of the objects and the relationships;
 providing the updated one or more states to one or more validation tools;
 receiving results from the one or more validation tools; and
 displaying the results in a user interface.

3. The method of claim 2 wherein the validation tools include a power budget analysis tool, a performance check tool, a portfolio decision tool, a policy check tool, and a best practices analysis tool.

4. The method of claim 1 wherein validating the received change order includes:
 validating other change orders that depend on the received change order; and
 displaying validation results for the other change orders.

5. The method of claim 1 further comprising determining a side effect caused by execution of the received change order or the revised change order, wherein the determining the side effect includes:
 following causality rules associated with the received change order or the revised change order backwards until side effect is encountered, wherein the side effect includes a change of state at an individual object that is not defined in the received change order or the revised change order that caused the side effect.

6. The method of claim 5, further comprising sending a notification of the side effect to a user affected by the side effect, wherein the notification indicates a service affected by the received change order or the revised change order that caused the side effect.

7. The method of claim 1 wherein the re-validating comprises detecting breaks downstream of the revised change order in both the first change plan and the second change plan.

8. The method of claim 1 wherein both the first change plan and the second change plan are modeled using a Configuration Management Database (CMDB) sandbox.

9. One or more computer readable storage media including computer-executable modules for a process aware change management system, the computer-executable modules comprising:
 a validation module configured to validate a change order to be executed as part of both a first change plan and a second change plan, wherein the change order defines a change to an Information Technology (IT) environment;
 a break detection module configured to detect breaks in one or more first change orders in the first change plan that depend on the change order and one or more second change orders in the second change plan that depend on the change order; and
 a side effects module configured to determine a side effect caused by execution of the change order by following one or more causality rules associated with the change order backwards until the one or more causality rules encounter the side effect, wherein the side effect includes a change of state to an object that is not defined in the change order that is caused by execution of the change order.

10. The one or more computer readable storage media of claim 9 wherein the validation module is further configured to:
 apply the change order to a model of the IT environment to update state of objects and relationships defined in the change order;
 provide the updated state to one or more validation tools; and
 receive results from the one or more validation tools.

11. The one or more computer readable storage media of claim 9 further comprising a user interface module, the user interface module being configured to:
 display a view of the IT environment;
 enable a user to create the change order;
 enable the user to update the view of the IT environment based on simulated execution of one or more scheduled change orders; and
 display the first change plan or the second change plan.

12. A method in a computing device for providing user interaction with a process aware change management user interface (UI) on a display, the method comprising:
 displaying the UI on the display, wherein the UI includes a view of an IT environment reflecting first states of objects and relationships at a first point in time in a Configuration Management Database (CMDB) and the UI further includes a slider positioned at the first point in time on a timeline;
 receiving an execution signal corresponding to moving the slider from the first point in time to a second point in time on the timeline, wherein the second point in time is later than the first point in time;

responsive to receiving the execution signal, changing the view of the IT environment to reflect second states of the objects and the relationships at the second point in time in the CMDB;

receiving a second execution signal to validate a change order shown in the timeline;

extracting information from the change order;

applying the change order to a model of the IT environment to update at least one of the first states or the second states for individual objects and individual relationships that are defined in the change order;

providing the updated at least one state to one or more validation tools;

receiving results from the one or more validation tools; and displaying the results in the UI, wherein at least the applying is performed by the computing device.

13. The method of claim 12 wherein the timeline shows the change order between the first point in time and the second point in time, wherein the change order is executed in a simulation of the IT environment when the slider is moved from the first point in time to the second point in time.

14. The method according to claim 1, wherein the re-validating comprises re-validating an individual first change order that is not in the second change plan and an individual second change order that is not in the first change plan.

15. The one or more computer readable storage media according to claim 9, wherein the one or more first change orders in the first change plan that depend on the change order are downstream of the change order in the first change plan.

16. A method, comprising:

receiving a change order to be executed at a scheduled time, wherein the received change order is included in both a first change plan and a second change plan and the received change order defines a change to an Information Technology (IT) environment;

validating the received change order against validation rules to simulate execution of the received change order at the scheduled time;

determining a side effect caused by execution of the received change order, wherein the determining the side effect includes following one or more causality rules associated with the received change order backwards until the one or more causality rules encounter the side effect of the received change order, wherein the one or more causality rules define at least one cause of a change of state at an object that is not defined in the received change order;

detecting a revision to the received change order resulting in a revised change order;

responsive to detecting the revision, re-validating at least:
one or more first change orders that are downstream of the revised change order in the first change plan, and
one or more second change orders that are downstream of the revised change order in the second change plan; and outputting results of the re-validating, wherein at least the determining the side effect is performed by a computing device.

17. A method in a computing device for providing user interaction with a process aware change management user interface (UI) on a display, the method comprising:

displaying the UI on the display, wherein the UI includes a view of an IT environment reflecting first states of objects and relationships at a first point in time in a Configuration Management Database (CMDB) and the UI further includes a slider positioned at the first point in time on a timeline;

receiving an execution signal corresponding to moving the slider from the first point in time to a second point in time on the timeline, wherein the second point in time is later than the first point in time;

responsive to receiving the execution signal, changing the view of the IT environment to reflect second states of the objects and the relationships at the second point in time in the CMDB;

receiving a second execution signal to create a new change order before a scheduled change order shown in the timeline;

creating the new change order from a change order template based on user input at the UI;

detecting one or more other change orders that depend on the new change order, wherein the one or more other change orders are part of one or more change plans;

validating the one or more other change orders that depend on the new change order; and displaying validation results in the UI for the one or more other change orders that depend on the new change order, wherein at least the validating is performed by the computing device.

18. A method in a computing device for providing user interaction with a process aware change management user interface (UI) on a display, the method comprising:

displaying the UI on the display, wherein the UI includes a view of an IT environment reflecting first states of objects and relationships at a first point in time in a Configuration Management Database (CMDB) and the UI further includes a slider positioned at the first point in time on a timeline;

receiving an execution signal corresponding to moving the slider from the first point in time to a second point in time on the timeline, wherein the second point in time is later than the first point in time;

responsive to receiving the execution signal, changing the view of the IT environment to reflect second states of the objects and the relationships at the second point in time in the CMDB;

determining a side effect caused by execution of a scheduled change order, wherein the side effect includes a change of state to an individual object not defined in the scheduled change order caused by execution of the scheduled change order, wherein determining the side effect includes following causality rules associated with the scheduled change order backwards until the causality rules encounter the side effect;

receiving a second execution signal to display the side effect of executing the scheduled change order; and displaying the side effect in the UI in response to the second execution signal, wherein at least the determining the side effect is performed by the computing device.

* * * * *